(12) United States Patent
Fujiwara et al.

(10) Patent No.: US 9,462,417 B2
(45) Date of Patent: Oct. 4, 2016

(54) INFORMATION COMMUNICATION TERMINAL AND LOCATION ESTIMATION

(75) Inventors: Yayoi Fujiwara, Kawasaki (JP); Hirofumi Isobe, Tokyo (JP); Makoto Kogoh, Yamato (JP); Yukihiro Murakami, Yamato (JP); Yasutaka Nishimura, Yamato (JP); Takahito Tashiro, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/984,353

(22) PCT Filed: Apr. 4, 2012

(86) PCT No.: PCT/JP2012/059205

§ 371 (c)(1),
(2), (4) Date: Aug. 8, 2013

(87) PCT Pub. No.: WO2013/001884

PCT Pub. Date: Jan. 3, 2013

(65) Prior Publication Data

US 2013/0324165 A1  Dec. 5, 2013

(30) Foreign Application Priority Data

Jun. 29, 2011 (JP) .................................. 2011-143685
Jul. 27, 2011 (JP) .................................. 2011-164359

(51) Int. Cl.
*H04M 1/00* (2006.01)
*H04W 4/02* (2009.01)
(Continued)

(52) U.S. Cl.
CPC .............. *H04W 4/023* (2013.01); *G01S 5/14* (2013.01); *G01S 11/06* (2013.01); *H04W 12/06* (2013.01);
(Continued)

(58) Field of Classification Search
CPC ............................... H04B 7/00; H04W 24/00
USPC .................................. 455/41.2, 456.1, 456.3
See application file for complete search history.

(56) References Cited

U.S. PATENT DOCUMENTS

| 8,493,896 B2* | 7/2013 | Yu et al. ...................... 370/310 |
| 2007/0037518 A1* | 2/2007 | Ninomiya et al. ........... 455/41.2 |
| 2008/0032757 A1 | 2/2008 | Sekine et al. | |

FOREIGN PATENT DOCUMENTS

| CN | 101351827 A | 1/2009 |
| JP | 2002-186012 A | 6/2002 |

(Continued)

OTHER PUBLICATIONS

Fujiwara, Akimasa, "Technology to Provide Information Tailored to The Physical Characteristics of Disabled People", Hiroshima University Graduate School, English Translation provided Aug. 23, 2013, 2 pages.

(Continued)

*Primary Examiner* — Lester Kincaid
*Assistant Examiner* — Gary Lafontant
(74) *Attorney, Agent, or Firm* — Stephen R. Tkacs; Stephen J. Walder, Jr.; David Zwick

(57) ABSTRACT

To provide a system capable of estimating a location of an information communication terminal and to provide an information communication terminal used for the system, a system includes multiple information communication terminals and a management server. Each information communication terminal has an agent program installed thereon. When the information communication terminal is connected to the wired LAN, an terminal information sending unit sends terminal identification information to cause the management server to generate location information. Upon receiving a mode change instruction, a communication mode changing unit changes a mode to cause the information communication terminal to function as a pseudo access point. When the information communication terminal is not connected to the wired LAN, a radio wave intensity measuring unit measures an intensity of the carrier wave from the PAP. The information communication terminal transmits a measurement result to the management server to cause the management server to estimate location information.

22 Claims, 17 Drawing Sheets

(51) Int. Cl.

| | | |
|---|---|---|
| *H04W 12/06* | (2009.01) | |
| *H04W 64/00* | (2009.01) | |
| *G01S 5/14* | (2006.01) | |
| *G01S 11/06* | (2006.01) | |
| *H04L 29/06* | (2006.01) | |
| *H04W 4/04* | (2009.01) | |
| *H04W 84/18* | (2009.01) | |

(52) U.S. Cl.
CPC .......... *H04W 64/00* (2013.01); *H04L 63/0492* (2013.01); *H04W 4/043* (2013.01); *H04W 84/18* (2013.01)

(56) References Cited

FOREIGN PATENT DOCUMENTS

| | | |
|---|---|---|
| JP | 2004-088440 A | 3/2004 |
| JP | 2004-104531 A | 4/2004 |
| JP | 2004-349802 A | 12/2004 |
| JP | 2005-140617 A | 6/2005 |
| JP | 2005-253018 A | 9/2005 |
| JP | 2005-260697 A | 9/2005 |
| JP | 2006108768 A | 4/2006 |
| JP | 2007-043303 A | 2/2007 |
| JP | 2007-104245 A | 4/2007 |
| JP | 2008-288727 A | 11/2008 |
| WO | WO2013/001884 A1 | 3/2013 |

OTHER PUBLICATIONS

Furuya, Toshio, "Mobility Support System Through Voiced Navigation, Etc. for Visually Impaired People", NPO Kotoba no Michiannai, English Translation provided Aug. 23, 2013, 1 page.

Nishio, Nobuhiko, "High Accuracy Position Specification Technology Necessary to Support Pedestrian Mobility", Ritsumeikan University, English Translation provided Aug. 23, 2013, 2 pages.

Oka, Ryuta et al., "Investigation and Evaluation of Prototype Dedicated Wireless LAN Access Points for a Position Specification Infrastructure and of Positioning Accuracy Control", The 73rd National Convention of IPSJ, Mar. 2-4, 2011, Tokyo Institute of Technology, Ookayama Campus, 1 page (English Abstract).

Wada, Chikamune, "High Accuracy Positition Specification Technology Necessary to Support Pedestrian Mobility", Kyushu Institute of Technology, English Translation provided Aug. 23, 2013, 1 page.

Akiko, Iwaya et al., "GOMASHIO: Model for Propagating Location Information in Sensor Networks", Information Processing Society of Japan, Nov. 15, 2001, 8 pages (English abstract).

Masayuki, Sato et al., "Estimation of Mobile Nodes Position Considering Accuracy for Ad-Hoc Networks", Information Processing Society of Japan, IPSJ SIG Technical Report, Mar. 5, 2004, 8 pages (English abstract).

Oka, Ryuta et al., "Investigation and Evaluation of Prototype Dedicated Wireless LAN Access Points for a Position Specification Infrastructure and of Positioning Accuracy Control", Information Processing Society of Japan, 73rd National Conference Presentation Abstract, May 27, 2011, 1 page.

* cited by examiner

| TERMINAL NAME/MAC | BUILDING | FLOOR | AREA |
|---|---|---|---|
| MOBILE TERMINAL 1/ 00-1F-BB-56-78 | TOKYO | 16F | EAST |
| ○○○ | ○○○ | ○○○ | ○○○ |

| BUILDING | FLOOR | AREA | IP ADDRESS RANGE |
|---|---|---|---|
| TOKYO | 15F | WEST | 192.168.1.0/24 |
| TOKYO | 16F | EAST | 192.168.2.0/24 |
| ○○○ | ○○○ | ○○○ | ○○○ |

| TERMINAL NAME/MAC | BUILDING | FLOOR | AREA |
|---|---|---|---|
| DEVICE A/<br>00-1F-AA-12-34 | OSAKA | 2F | EAST |
| ○<br>○<br>○ | ○<br>○<br>○ | ○<br>○<br>○ | ○<br>○<br>○ |

| MAC ADDRESS | RADIO WAVE INTENSITY |
|---|---|
| 00-1F-BB-56-78 | 90 % |
| 00-2A-CC-11-22 | 70 % |
| ⋮ | ⋮ |

| DEVICE ID 1 | DEVICE ID 2 | DISTANCE |
|---|---|---|
| PC01 | PC02 | 4.5m |
| PC01 | PC03 | 3.9m |
| PC02 | PC03 | 3.2m |
| PC03 | PC04 | 2.3m |
| PC03 | PC05 | 4.8m |
| PC04 | PC05 | 4.6m |
| PC04 | PC06 | 4.7m |
| PC05 | PC06 | 2.4m |
| PC05 | PC07 | 3.9m |
| PC06 | PC07 | 3.8m |
| PC06 | PC08 | 4.0m |
| PC07 | PC08 | 4.1m |
| ○○○ | ○○○ | ○○○ |

| PAP ID | DEVICE ID | DISTANCE |
|---|---|---|
| PC01 | PC11 | 3.7m |
| PC02 | PC11 | 2.3m |
| PC03 | PC11 | 3.5m |
| PC03 | PC12 | 3.2m |
| PC03 | PC13 | 3.6m |
| PC04 | PC12 | 4.5m |
| PC04 | PC13 | 1.4m |
| PC04 | PC14 | 3.8m |
| PC05 | PC12 | 3.5m |
| PC05 | PC14 | 2.6m |
| PC06 | PC13 | 3.5m |
| PC06 | PC14 | 1.4m |
| PC06 | PC15 | 2.8m |
| PC06 | PC16 | 4.3m |
| PC07 | PC15 | 3.4m |
| PC07 | PC16 | 2.7m |
| PC08 | PC15 | 2.2m |
| PC08 | PC16 | 2.4m |

FIG. 24

| PAP ID | DEVICE ID | DISTANCE |
|---|---|---|
| PC01 | PC11 | 3.7m |
| PC02 | PC11 | 2.3m |
| PC03 | PC11 | 3.5m |
| PC03 | PC12 | 3.2m |
| PC03 | PC13 | 3.6m |
| PC04 | PC12 | 4.5m |
| PC04 | PC13 | 1.4m |
| PC04 | PC14 | 3.8m |
| PC05 | PC12 | 3.5m |
| PC05 | PC14 | 2.6m |
| PC06 | PC13 | 3.5m |
| PC06 | PC14 | 1.4m |
| PC06 | PC15 | 2.8m |
| PC06 | PC16 | 4.3m |
| PC07 | PC15 | 3.4m |
| PC07 | PC16 | 2.7m |
| PC08 | PC15 | 2.2m |
| PC08 | PC16 | 2.4m |

FIG. 23

INFORMATION COMMUNICATION TERMINAL AND LOCATION ESTIMATION

BACKGROUND

The present invention relates to a system for estimating locations of respective information communication terminals, and the information communication terminals used in the system, an agent program, and a location estimation method for the system. More specifically, the present invention relates to a system for estimating locations of respective information communication terminals connected to a wireless local area network (LAN), on the basis of a location of a pseudo-access point that is an information communication terminal connected to a wired LAN; the information communication terminals used in the system; an agent program implemented in each of the information communication terminals, and a location estimation method for the system.

As portable information communication terminals such as a mobile phone, a smartphone, a tablet personal computer (PC), and a notebook PC have become used widely, users have come to always carry such information communication terminals with them. A global positioning system (UPS) function is now equipped in such an information communication terminal, and there are provided many services using location information acquired by using the GPS function.

Such services include displaying the location of the user on a map, guiding the user to a destination, and the like.

There is known a technique by which location information of a mobile terminal is acquired based on information on cells of base stations, information acquired from the GPS, and the like, and is registered in a server by using a long-distance wireless network based on wideband code division multiple access (W-CDMA), personal digital cellular (PDC), CDMA2000 or the like. The technique, however, incurs high usage costs, and thus anew technique is desired by which the location information of the information communication terminal can be acquired simply at low cost.

Recently, a wireless local area network (LAN) which is one of short-distance radio communication systems has been widely spread in the market, and thus there has been proposed a technique of acquiring location information of an information communication terminal simply at low cost by using the wireless LAN.

In addition, a technique has been proposed in which positioning access points are provided, and the detection accuracy of location information is enhanced by using the intensity of the wireless LAN. This technique achieves low cost and enhanced detection accuracy by making radio wave areas small in a way that wireless LAN access points serving as infrastructures for identifying a location are installed in an indoor place where the GPS cannot be used, and are operated to transmit only beacons only necessary for the positioning.

Further, other techniques have been proposed. Specifically, in an ad-hoc mode, a mobile node receives as a beacon packet a packet including location information transmitted from a known terminal through an ad-hoc network, and estimates its own location based on a hop count or the like in the path to the mobile terminal. In the techniques, a terminal acquiring an absolute location by using the GPS advertises its own location information to neighboring terminals, and a terminal receiving the advertised information estimates its own location range based on the advertised information and a hop count in the path from the GPS to the terminal itself.

Meanwhile, one of known techniques of estimating a location based on a radio wave is a received signal strength indication (RSSI) scheme. This scheme uses a relationship between a distance and attenuation of the radio wave intensity, and estimates a distance between a node (end point) supposed to estimate its own location and a node transmitting the radio wave on the basis of the intensity of the received radio wave. The technique will be described by referring to FIG.

FIG. 1 shows that a notebook PC 1 which is an end point is located in coordinates ($x_{Est}$, $y_{Est}$, $z_{Est}$) showing a three-dimensional location. In addition, four notebook PCs 2, 3, 4, and 5 which neighbor the notebook PC 1 and transmit radio waves are respectively located in coordinates ($x_1$, $y_1$, $z_1$), ($x_2$, $y_2$, $z_2$), ($x_3$, $y_3$, $z_3$), and ($x_4$, $y_4$, $z_4$), and respectively have distances $r_1$, $r_2$, $r_3$, and $r_4$ from the notebook PC 1.

Suppose that the notebook PC 1 actually measures the intensities of the radio waves from the notebook PCs 2, 3, 4, and 5 and acquires values $p_1$, $p_2$, $p_3$, and $p_4$. FIG. 2 shows a relationship among the values $p_1$, $p_2$, $p_3$, and $p_4$ and the distances $r_1$, $r_2$, $r_3$, and $r_4$. FIG. 2 shows that the radio wave intensity is inversely proportional to the distance.

In this scheme, distances between the end point and the multiple nodes are estimated, and the three-dimensional coordinates ($x_{Est}$, $y_{Est}$, $z_{Est}$) can be calculated by using the distances in accordance with the following simultaneous equations.

$$(x_{Est}-x_1)^2 \Leftrightarrow (y_{Est}-y_1)^2 + (z_{Est}-z_1)^2 = r_1^2$$

$$(x_{Est}-x_2)^2 + (y_{Est}-y_2)^2 + (z_{Est}-z_2)^2 = r_2^2$$

$$(x_{Est}-x_3)^3 + (y_{Est}-y_3)^2 + (z_{Est}-z_3)^2 = r_3^2$$

$$(x_{Est}-x_4)^4 + (y_{Est}-y_4)^2 + (z_{Est}-z_4)^2 = r_4^2 \qquad \text{Formula 1:}$$

There is another technique called a time difference of arrival (TDoA) scheme. This scheme measures a time difference between a radio wave transmission time of a node transmitting a radio wave and a radio wave reception time of an end point and calculates a distance between the node and the end point based on the time difference and the transmission speed of the radio wave.

In a configuration shown in FIG. 1, time differences $t_1$, $t_2$, $t_3$, and $t_4$ are obtained based on times of transmitting radio waves by the notebook PCs 2, 3, 4, and 5 and times of receiving the radio waves by the notebook PC 1. FIG. 3 shows a relationship among the time differences $t_1$, $t_2$, $t_3$, and $t_4$ and the distances $r_1$, $r_2$, $r_3$, and $r_4$. FIG. 3 shows that the time difference is proportional to the distance.

Also in this scheme, distances between the end point and the multiple nodes are estimated. The three-dimensional coordinates (xEst, yEst, zEst) can be calculated by using the distances in accordance with simultaneous equations similar to the Formula 1 above.

SUMMARY

In one illustrative embodiment, an information communication terminal comprises a processor and a memory coupled to the processor. The memory comprises instructions which, when executed by the processor, cause the processor to responsive to the information communication terminal being connected to a wired network and receiving from a management server a mode change instruction to switch to a communication mode of performing wireless communication directly with at least one other information communication terminal, switch the communication mode to a pseudo-access point (PAP) communication mode. The instructions further cause the processor to broadcast a carrier wave comprising terminal identification information of the information communication terminal responsive to the information communication terminal being in the PAP communication mode. The instructions further cause the processor to responsive to the information communication terminal not being connected to the wired network, measure an intensity of a carrier wave that is broadcasted by a second information communication terminal functioning in the PAP communication mode. The carrier wave comprises terminal identification information of the second information communication terminal. The instructions further cause the processor to transmit the measured intensity to the management server together with the terminal identification information of the second information communication terminal. The management server estimates location information of the information communication terminal by using the location information of the second information communication terminal and the measured intensity and stores the estimated location information in association with the terminal identification information of the information communication terminal.

In another embodiment, A computer program product comprises a computer readable storage medium having a computer readable program stored therein. The computer readable program, when executed on an information communication terminal, causes the information communication terminal to responsive to the information communication terminal being connected to a wired network and receiving from a management server a mode change instruction to switch to a communication mode of performing wireless communication directly with at least one other information communication terminal, switch a communication mode to a pseudo-access point (PAP) communication mode. The computer readable program further causes the information communication terminal to broadcast a carrier wave comprising, terminal identification information of the information communication terminal responsive to the information communication terminal being in the PAP communication mode. The computer readable program further causes the information communication terminal to responsive to the information communication terminal not being connected to the wired network, measure an intensity of a carrier wave that is broadcasted by a second information communication terminal functioning in the PAP communication mode. The carrier wave comprises terminal identification information of the second information communication terminal. The computer readable program further causes the information communication terminal to transmit the measured intensity to the management server together with the terminal identification information of the second information communication terminal. The management server estimates location information of the information communication terminal by using the location information of the second information communication terminal and the measured intensity and stores the estimated location information in association with the terminal identification information of the information communication terminal.

In another illustrative embodiment, a location estimation system comprises a plurality of information communication terminals and a management server connected to a wired network and configured to estimate a location of each of the plurality of information communication terminals and to store location information of the plurality of information communication terminals. Responsive to a given information communication terminal receiving from the management server a mode change instruction to switch to a communication mode of performing wireless communication directly with a different information communication terminal, the given information communication terminal switches a communication mode to a pseudo-access point (PAP) communication mode. The given information communication terminal broadcasts a carrier wave comprising terminal identification information of the given information communication terminal responsive to the given information communication terminal being in the PAP communication mode. Responsive to the given information communication terminal not being connected to the wired network, the given information communication terminal measures an intensity of a carrier wave that is broadcasted by a second information communication terminal functioning in the PAP communication mode, wherein the carrier wave comprises terminal identification information of the second information communication terminal. The given information communication terminal transmits the measured intensity to the management server together with the terminal identification information of the second information communication terminal. The management server estimates location information of the information communication terminal by using the location information of the second information communication terminal and the measured intensity and stores the estimated location information in association with the terminal identification information of the information communication terminal.

In another illustrative embodiment, a method is performed by a location estimation system including a plurality of information communication terminals and a management server connected to a wired network and configured to estimate a location of each of the plurality of information communication terminals. The method comprises the managing server selecting one of the information communication terminals connected to the wired network, as an information communication terminal to function as a pseudo-access point (PAP), according to a certain rule, and issuing, to the selected information communication terminal, a mode change instruction to switch to a communication mode of performing wireless communication directly with a different one of the information communication terminals. The method further comprises the managing server storing terminal identification information and location information of the selected information communication terminal in association with each other in a PAP database. The method further comprises the selected information communication terminal switching to the communication mode and to function as the PAP, responsive to receiving the mode change instruction. The method farther comprises the selected information communication terminal functioning as the PAP broadcasting a carrier wave comprising the terminal identification information of the selected information communication terminal functioning as the PAP. The method farther comprises a given information communication terminal, responsive to determining the given information communication terminal is not connected to the wired network, measuring an intensity of a carrier wave that is broadcasted by the selected information communication terminal functioning as the PAP, wherein the carrier wave comprises terminal identification information of the selected information communication terminal, transmitting the measured intensity to the management server together with the terminal identification information of the selected information communication terminal functioning as the PAP. The method further comprises the management server estimating location information of the given information communication terminal by using the location information of the selected information communication terminal functioning as the PAP and the measured intensity and storing the estimated location information in association with the terminal identification information of the given information communication terminal in a terminal database.

BRIEF DESCRIPTION OF THE SEVERAL VIEWS OF THE DRAWINGS

FIG. 23 is a table illustrating second distance information.

FIG. 24 is a table showing that three or more information communication terminals connected to a wired LAN are identified for each information communication terminal connected to a wireless LAN.

DETAILED DESCRIPTION

Figure 1:
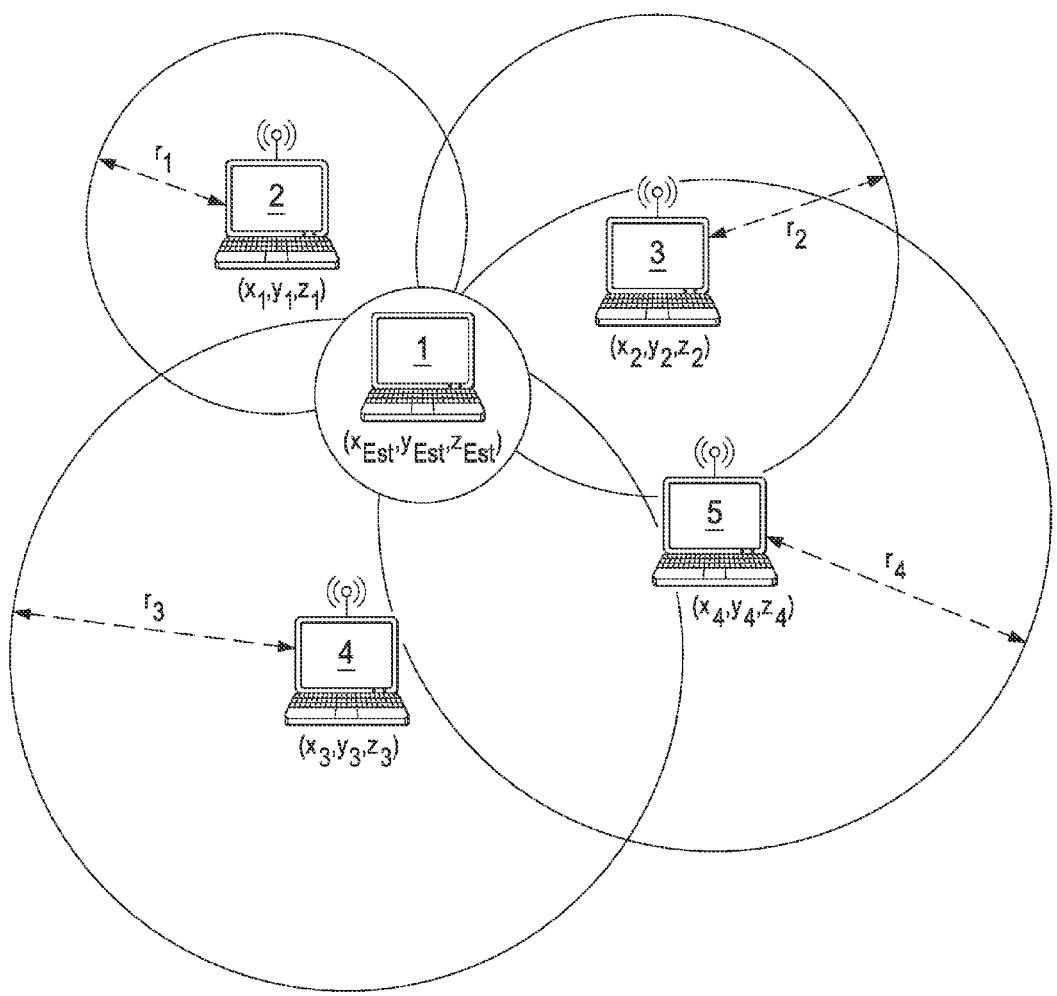
FIG. 1 is a diagram illustrating a system configuration employed in a conventional technique of estimating a location of an information communication terminal on the basis of a radio wave.

An information communication terminal having a UPS function can acquire three-dimensional location coordinates as location information by use of this function. However, the information communication terminal cannot acquire such location information when used indoors, e.g., an office environment, where a GPS radio wave is not reachable.

In such a case, the information communication terminal can acquire location information by using a sensor or a wireless LAN as in the prior art techniques. Specifically, installation of access point equipment and application of the above-described RSSI or TDoA enable the information communication terminal to acquire three-dimensional location coordinates as location information. Alternatively, as in the prior art techniques, a network used for communication itself is formed of an ad-hoc network, and an information communication terminal is allowed to estimate its own location by acquiring the absolute locations of other terminals using the UPS.

The techniques described in the prior art, however require that additional hardware, i.e., access point equipment, be placed in an appropriate location and location information of the equipment be registered in advance. Moreover, in a case of acquiring location information by using the RSSI, a relationship between distance and attenuation of the radio wave intensity needs to be acquired and modeled in advance. Further, to estimate location information in three-dimensional location coordinates, at least three nodes are required, and moreover the three-dimensional location coordinates of all the nodes need to be registered in advance and managed individually by the nodes.

Similarly, in a case of acquiring location information by using the TDoA, at least three nodes are required, and moreover the three-dimensional location coordinates of all the nodes need to be registered in advance and managed individually by the nodes. In addition, the nodes and an end point must be synchronized in terms of time.

The techniques described in the prior art require that a network used for communication itself be formed of an ad-hoc network, and therefore a network configuration of an office has to be changed significantly only for location identification.

Such being the case, a system and a method have been desired that are capable of estimating an approximate indoor location (e.g., a building, a floor or an area) in which each information communication terminal performing wireless communication exists, without requiring any new additional hardware, prior registration or management of location information of each node, or any change in a network configuration.

In view of the aforementioned problems, the illustrative embodiments described herein employ the following configuration. Specifically, in a DHCP network environment of an office, approximate locations, such as a building a floor, or an area, of information communication terminals connected to the wired LAN are estimated from IP addresses assigned by a dynamic host configuration protocol (DHCP) server. In addition, when one of the information communication terminals performing wireless communication is connected to the wired LAN, a mode of a wireless LAN adaptor thereof is dynamically changed to an ad-hoc mode to cause the information communication terminal to function as a pseudo access point (PAP). Then, a radio wave intensity of the information communication terminal functioning as the PAP is checked, and thereby a location (a building, a floor or an area) of the information communication terminal connected to the wireless LAN is estimated.

Recently, most of information communication terminals include a wireless LAN adaptor, and measurement of radio wave intensity can be achieved by software. Thus, an indoor location of an information communication terminal can be estimated without requiring new additional hardware, prior registration or management of location information of each node. For this reason, indoor location information can be acquired simply and at low cost.

The illustrative embodiments can achieve this by providing an information communication terminal, an agent program implemented on the information communication terminal, a location estimation system including the information communication terminal, and a method therefor.

Specifically, in a system including multiple information communication terminals and a management server connected to a wired network and configured to estimate a location of each of the plurality of information communication terminals and to then register and manage location information of the information communication terminal, the information communication terminal functions as agent means by executing an installed agent program.

The agent means includes a connection judging unit for checking a network connection state of the information communication terminal, and judging whether the information communication terminal is connected to the wired network; a terminal information sending unit for, if the information communication terminal is judged to be connected to the wired network, sending the management server terminal identification information including a network address of the information communication terminal assigned by an address assigner, and causing the management server to generate location information of the information communication terminal on the basis of the network address and to register and manage the location information in association with the terminal identification information; a communication mode changing unit for, upon receiving from the management server a mode change instruction to switch to a communication mode of performing wireless communication directly with a different one of the information communication terminals, causing the information communication terminal to switch to the communication mode and to function as a PAP; and a carrier wave broadcasting unit for broadcasting a carrier wave added with the terminal identification information of the information communication terminal as the PAP.

The agent means further includes an intensity measuring unit for, if the information communication terminal is judged not to be connected to the wired network, measuring an intensity of a carrier wave that is broadcasted by a different one of the information communication terminals functioning as the PAP and is added with terminal identification information of the different information communication terminal; and a measurement result transmitting unit for transmitting the measured intensity to the management server together with the terminal identification information of the different information communication terminal functioning as the PAP, and causing the management server to estimate location information of the information communication terminal by using the location information of the different information communication terminal functioning as the PAP and the measured intensity and to register and manage the estimated location information in association with the terminal identification information of the information communication terminal.

The agent means further includes a PAP mode judging unit for, in response to the judging that the information communication terminal is connected to the wired network, judging whether the information communication terminal is set in a PAP mode. If the PAP mode judging unit judges that the information communication terminal is not set in the PAP mode, the terminal information sending unit can send the management server the terminal identification information to cause the management server to generate location information. In addition, upon receiving the mode change instruction from the management server, the communication mode changing unit can change the communication mode. When the PAP mode judging unit judges that the information communication terminal is set in the PAP mode, the carrier wave broadcasting unit can broadcast a carrier wave added with the terminal identification information.

Upon receiving from the management server the mode change instruction to switch to a communication mode of performing wireless communication via an access point connected to the wired network, the communication mode changing unit can cause the information communication terminal to switch to the communication mode and to function as a non-PAP. That is, in response to the mode change instruction from the management server, the communication mode changing unit can cause the information communication terminal to switch between the communication mode of functioning as the PAP and the communication mode of functioning as the non-PAP and can implement a function of the changed communication mode.

The carrier wave added with the terminal identification information broadcasted by the carrier wave broadcasting unit is also added with PAP identification information for identifying the PAP, and is broadcasted at regular intervals. Thereby, each carrier wave broadcasted from the corresponding PAP can be identified, and carrier wave transmission and reception timing can be synchronized.

The intensity measuring unit can measure only a carrier wave having an intensity higher than a threshold and cut off a carrier wave having an extremely low intensity lower than the threshold. Thereby, only a carrier wave on the same floor or room can be received to identify the location of the information communication terminal more easily. Note the carrier wave can be an electromagnetic wave including an electronic wave and light, or an ultrasonic wave. The carrier wave broadcasting unit can also broadcast the carrier wave while controlling the intensity thereof. If the intensity of the broadcasted carrier wave can be controlled, a carrier wave broadcasted from upper or lower floor or a different room shielded by a wall can be prevented from being detected without the need for providing the threshold. Thus, only a carrier wave on the same floor or room can be received to identify the location of the information communication terminal more easily.

The agent program causes the information communication terminal to function as the agent means and to execute processing performed by the aforementioned units. Thus, an approximate location of the information communication terminal can be estimated without adding hardware.

However, locations of wired network connection ports (wired LAN ports) might not appropriately managed, depending on the office. In such a case, the locations of the connection ports are unknown. Thus, even if an information communication terminal functioning as a PAP (hereinafter, referred to as a PAP-functioning information communication terminal) located closest to an information communication terminal which is connected to the wireless network and a location of which is estimated can be identified, the location of the PAP-functioning information communication terminal is unknown. Hence, in order to identify the location, the location estimation system can be configured such that, even when the information communication terminal is judged to be connected to the wired network and does not function as the PAP, the intensity measuring unit measures the intensity of the carrier wave and the measurement result transmitting unit transmits the measured intensity to the management server. Thereby, the management server can identify the locations of the information communication terminals connected to the wired network by calculating a distance between the information communication terminal connected to the wired network and not functioning as the PAP and each of the other information communication terminals based on the intensity, by acquiring a relative positional relationship between the information communication terminals connected to the wired network based on the distance, and by mapping the relationship on an arrangement map of the wired network connection ports. Thus, the location of each information communication terminal connected to the wireless network can be estimated as described above based on a location of an information communication terminal connected to the wired network which is located closest to the information communication terminal to be estimated.

If the PAP mode judging unit judges that the information communication terminal is not set in the PAP mode, the intensity measuring unit of the information communication terminal measures the carrier wave broadcasted from the PAP-functioning different information communication terminal, and the measurement result transmitting unit can send the management server the terminal the measured intensity together with the identification information of the different information communication terminal.

The location estimation system including the multiple information communication terminals and the management server is configured such that the management server manages a range information database, a terminal database, and a PAP database for the information communication terminals configured as above. The range information database stores therein location information and a range of network addresses in association with each other. The terminal database stores therein the terminal identification information of the information communication terminal and location information of the information communication terminal in association with each other. The PAP database stores therein the terminal identification information and the location information of an information communication terminal functioning as the PAP in association with each other.

Upon receiving the terminal identification information transmitted from the information communication terminal, the management server refers to the range information database, generates location information of the information communication terminal, and updates the terminal database by registering the location information in the terminal database in association with the terminal identification information.

The management server selects, in accordance with a certain rule, one of the information communication terminals connected to the wired network information communication terminal to cause the information communication terminal to function as the PAP, and issues to the selected information communication terminal the mode change instruction to switch to the communication mode of performing wireless communication directly with a different one of the information communication terminals.

The management server refers to the PAP database on the basis of the terminal identification information of the PAP-functioning information communication terminal which achieves the highest intensity among the intensities received from the information communication terminals connected to the wireless radio network, acquires the location information associated with the terminal identification information, and updates the terminal database by registering the location information in the terminal database as location information of the information communication terminal connected to the wireless network.

From the above, the management server may include a location estimating unit and the instruction issuing unit, the location estimating unit generating location information by using the range information database, acquiring location information based on the PAP database, and updating the terminal database, the instruction issuing unit transmitting the communication mode change instruction. The databases may be provided externally in separation from the management server or may be incorporated into the management server.

If the locations of the wired network connection ports are not appropriately managed, the management server refers to the terminal database, selects one of the information communication terminals connected to the wired network in turn, and issues a mode change instruction to the selected information communication terminal to function as the PAP. Note that while the selected information communication terminal is functioning as the PAP, the other information communication terminals which are not selected do not function as the PAP. While the selected information communication terminal is functioning as the PAP, each of the unselected information communication terminals connected to the wired network measures the intensity of the carrier wave added with the terminal identification information broadcasted from the PAP-functioning information communication terminal and transmits the measured intensity to the management server together with the terminal identification information of the PAP-functioning information communication terminal. At this time, the information communication terminal also transmits the terminal identification information of the information communication terminal itself added to the measured intensity.

Based on the intensity received from the information communication terminal, the management server calculates a distance between the PAP-functioning information communication terminal identified from the terminal identification information and the information communication terminal also identified by the terminal identification information. The distance is calculated by using a chart showing a relationship between the intensity and the distance, equations, a correspondence table, and the like which are provided in advance. The management server stores the calculated distance as first distance information in association with the corresponding terminal identification information of the information communication terminal and manages the distance. The management server holds a map showing an arrangement of the wired network connection ports as map data, and identifies which wired network connection port the information communication terminal is connected to on the map generated by the map data by using the first distance information.

Specifically, the management server generates a relative positional relationship chart showing a two-dimensional relative positional relationship among the information communication terminals by using the first distance information, maps the generated relative positional relationship chart on the map, and identifies a location of each of the information communication terminals, on the basis of a location of a corresponding one of the wired network connection ports.

If one floor is divided into two or more areas and multiple information communication terminals are arranged in each area, it is preferable that the management server generate the relative positional relationship chart for each area, combine at least two relative positional relationship charts of adjacent areas together, and identify the locations of the information communication terminals by using the combined relative positional relationship chart. This is performed for easy mapping.

While the management server is identifying the locations of the information communication terminals connected to the wired network each of information communication terminals connected to the wireless network can also measure the intensity of the carrier wave broadcasted from the PAP-functioning information communication terminal and added with terminal identification information of the PAP-functioning information communication terminal and transmit the measured intensity to the management server together with the terminal identification information of the PAP-functioning information communication terminal. At this time, the information communication terminal also transmits terminal identification information of the information communication terminal itself added to the measured intensity to the management server. Note that the processing can also be performed in the following manner. Specifically, after identifying the locations of the information communication terminals connected to the wired network, the management server again causes one of the information communication terminals connected to the information communication terminals connected to the wired network to function as the PAP in turn. Then, the information communication terminal connected to the wireless network measures the intensity and transmits the measurement result to the management server.

The management server receives the intensity also from the information communication terminal connected to the wireless network, together with the terminal identification information of the information communication terminal and the PAP-functioning information communication terminal, the intensity being obtained by measuring the carrier wave broadcasted by the PAP-functioning information communication terminal. Then, the management server calculates a distance between the information communication terminals based on the intensity. Thereafter, the management server stores and manages the calculated distance as second distance information in association with the terminal identification information of the information communication terminals.

For each of the information communication terminals connected to the wireless network, the management server selects at least three pieces of terminal identification information of information communication terminals connected to the wired network which are stored in association with terminal identification information of each information communication terminal connected to the wireless network, by using the second distance information, acquires distances respectively associated with the at least three selected pieces of terminal identification information, and draws circles on the map on which the relative positional relationship chart is mapped, the circles having the centers of the information communication terminals identified by the at least three selected pieces of terminal identification information and having radii of the acquired distances. Thereby, the management server estimates that an intersection of the at least three circles thus drawn is a location of the information communication terminal connected to the wireless network. Then, the management server registers the estimated location in the terminal database together with the terminal identification information of the information communication terminal.

The location estimation method implemented by the location estimation system includes processing steps performed by each information communication terminal described above and processing steps performed by the management server.

The present invention will be described below by using specific embodiments shown with reference to the drawings, but is not limited to the embodiment to be described later. A business builds up a small-scale network in areas on floors of a building by using a LAN; a middle-scale network in the building by connecting the small-scale networks by using communication equipment (routers) mutually connecting the small-scale networks; and a corporate network environment by connecting to networks built up by distant factories, branch offices, affiliated companies, and the like through the Internet, a Wide Area Ethernet, a wide area network (WAN), and the like.

A location estimation system is applicable to such a corporate network environment, for example. Even in an indoor environment in which a GPS radio wave is not receivable, the location estimation system is also capable of easily estimating in which area, on which floor, and in which building an information communication terminal connected to a wireless LAN exists, without requiring addition special hardware, prior registration or management of location information of an access pint. Information communication terminals are devices used for this location estimation system and each serve as agent means by installing and executing an agent program on a computer. The information communication terminal is used for estimating locations of the information communication terminal itself and other information communication terminals all of which are connected to the wireless LAN.

Figures 4, 5, 6:
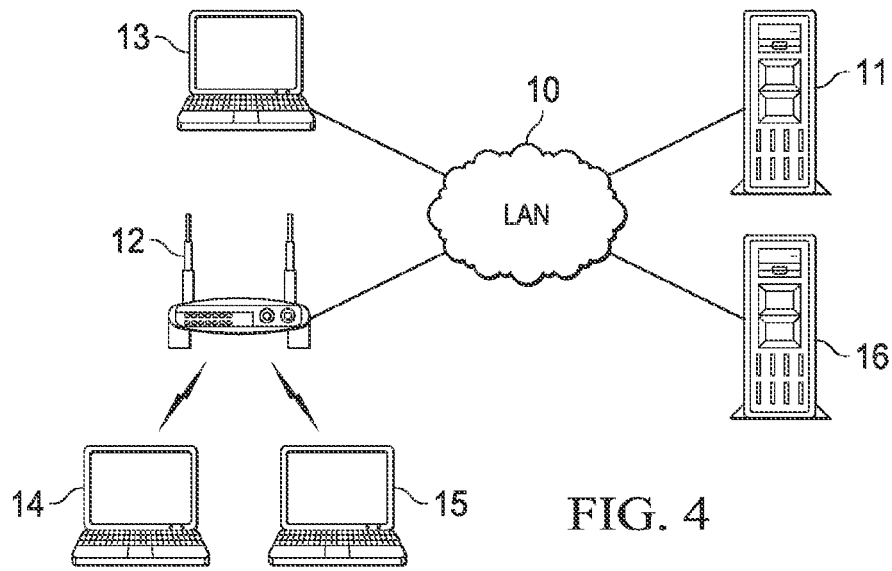
FIG. 4 is a diagram showing a location estimation system of an embodiment.
FIG. 5 is a table illustrating a terminal database managed by a management server.
FIG. 6 is a table illustrating a range information database managed by the management server.

Firstly, the location estimation system is described by referring to FIG. 4, FIG. 4 is a diagram showing a configuration of the location estimation system of this embodiment. The location estimation system includes a management server 11 connected to a wired LAN 10, a management server an access point 12, an information communication terminal 13, and information communication terminals 14 and 15 connected to a wireless LAN through the access point 12. The management server 11, the access point 12, and the information communication terminal 13 may thrill wired networks by being mutually connected using network cables.

A dynamic host configuration protocol (DHCP) server 16 is connected to the wired LAN 10, the wired LAN 10 being intended to build up a DHCP network environment in which an IP address as a network address is automatically assigned to devices connected to the wired LAN 10. In this network configuration, it is possible to provide the function of the DHCP server 16 to the management server 11 and thus to omit the DHCP server 16.

FIG. 4 shows the only one wired network which is the wired LAN 10, but the network configuration may be employed as described above in which the multiple wired LANs are mutually connected by a router or via a wide area network such as the Internet.

Even if the multiple wired LANs are mutually connected by the router, the management server 11 is connected to one of the wired LANs. The management server 11 manages a terminal database for storing location information of the information communication terminal 13 connected to the wired LAN and the information communication terminals 14 and 15 connected to the wireless LAN; a range information database for storing information on an IP address range assigned by the DHCP server 16; and a PAP database for storing location information of the information communication terminal 13 in a case where the information communication terminal 13 is set in a PAP mode.

The management server 11 includes a storage device storing therein applications and data which are for registering the location information and the like in the databases, updating the databases, and executing processing by referring to the databases; a processor loading the applications and data from the storage device and executing the processing; and a communication interface for connecting to the wired. LAN 10.

The management server 11 stores an operating system (OS) appropriate for the storage device and performs the processing by executing the applications under the control of the OS. As the OS, Windows (registered trademark), LINUX (registered trademark), Mac OS (registered trademark), and the like may be used.

The terminal database managed by the management server 11 stores location information of the information communication terminals 13, 14 and 15 by using a table shown in FIG. 5. The table includes a terminal name field for inputting a terminal name and a media access control (MAC) address as terminal identification information for identifying a terminal; a building field for inputting information for identifying a building; a floor field for inputting, a floor as information for identifying the floor of the building; and an area field for inputting an area as information for identifying the area on the floor, FIG. 5 shows that location information of the information communication terminal 13 is acquired, and the fields have inputted information of a terminal name "Mobile terminal 1," a MAC address "00-1F-BB-56-78" of the terminal, a building name "Tokyo" as location information, a floor "16F," and an area "East," respectively.

The range information database stores Internet protocol (IP) address ranges in a table shown in FIG. 6, the IP address ranges being assigned by the DHCP server 16 to respective areas. The table includes a building field, a floor field, an area field, and an IP address range field associated with each other. The IP address ranges are predetermined and assigned to the respective areas by the DHCP server 16. FIG. 6 shows that information communication terminals existing in a western area of the 15th floor in the Tokyo building are assigned IP addresses "192.168.1.0 to 192.168.1.24," and information communication terminals existing in an eastern area of the 16th floor in the Tokyo building are assigned IP addresses "192.168.2.0 to 192.168.2.24."

Figures 7, 8:
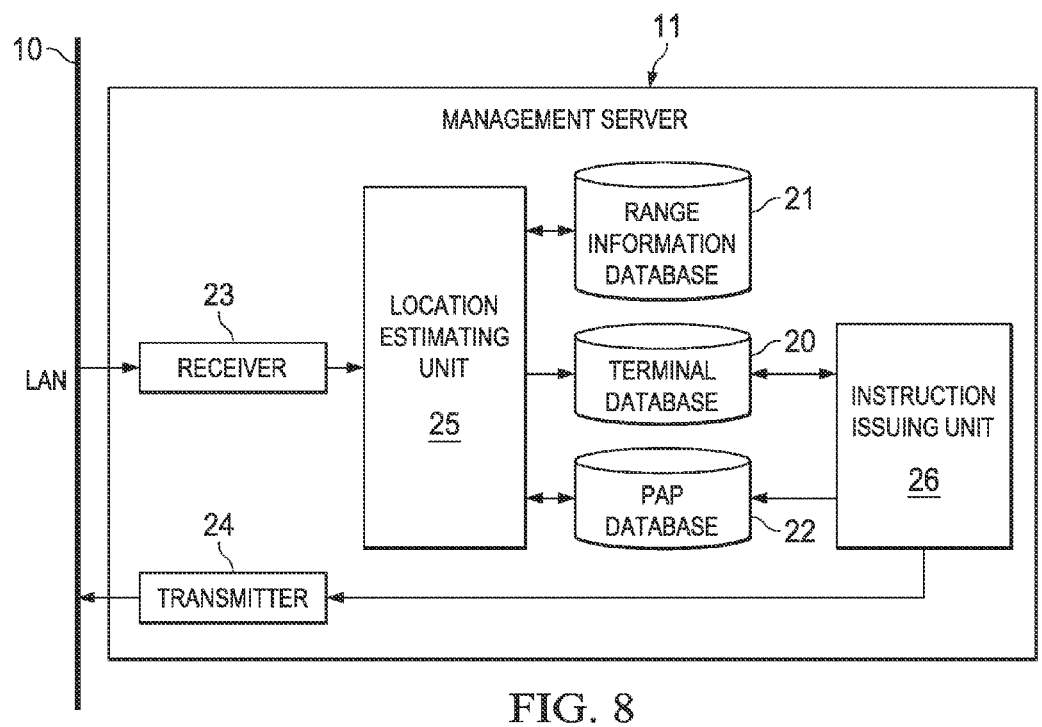
FIG. 7 is a table illustrating a pseudo access point (PAP) database managed by the management server.
FIG. 8 is a functional block diagram of the management server included in the location management system.

The PAP database stores location information of information communication terminals set as PAPs in a table show in FIG. 7. The table includes a terminal name field, a building field, a floor field, and an area field, FIG. 7 shows that one of the information communication terminals having a terminal name of "Device A" and a MAC address of "00-1F-AA-12-34" is set as a PAP, and exists in an eastern area on the second floor of an Osaka building.

Since the management server 11 requires prior registration of the IP address range information to be stored in the range information database, a person in charge of managing the location estimation system needs to input the information. For this reason, the management server 11 may further include an input device such as a keyboard and a display device such as a display for displaying and checking inputted information.

The access point 12 is connected to the wired LAN 10 and mutually connects the information communication terminals 14 and 15 which are connected to the wireless LAN. The access point 12 is used when the information communication terminals 14 and 15 communicate with the information communication terminal 13 and the management server 11 which are connected to the wired LAN. The access point 12 may have the router function incorporated therein to mutually connect the wired LANs built up in the areas.

The information communication terminals 13, 14 and 15 each include a wireless LAN adapter and have two modes of an infrastructure mode and an ad-hoc mode as communication modes to connect the wireless LAN. The infrastructure mode is a mode in which information communication terminals communicate with each other via the access point 12, while the ad-hoc mode is a mode in which the information communication terminals communicate with each other directly.

The access point 12 includes a receiver configured to receive a signal transmitted from any of the information communication terminals 14 and 15 through the wireless LAN connection; a transmitter configured to transmit a signal to any of the information communication terminals 14 and 15 through the wireless LAN connection; and a communication interface configured to connect to the wired LAN 10. The transmitter includes a modulation circuit configured to change the amplitude, the frequency, and the phase of a carrier wave to add information to the carrier wave. The receiver includes a demodulation circuit configured to extract information from the received carrier wave.

Like the management server 11, the information communication terminals 13, 14 and 15 each include a storage device, a processor, a communication interface, an input device, and a display device. In addition, the information communication terminals 13, 14 and 15 each include a transceiver for achieving the wireless LAN connection with the access point 12 and a different one of the information communication terminals 13, 14 and 15. The storage device stores therein various applications including the wireless LAN adapter, data, and the aforementioned agent program. The processor loads the applications, data, and the agent program from the storage device and executes processing thereof. The storage device also stores an appropriate OS, and the processor executes the processing under control of the OS. As the information communication terminals 13, 14 and 15, a mobile phone, a smartphonce, a PDA, a notebook PC, a tablet PC, or the like can be used.

The agent program can be stored in a computer-readable recording medium such as a flexible disk, a compact disk read-only memory (CD-ROM), a digital video disk (DVD), and a secure digital (SD) card, and thus to be provided. The agent program can be read from the recording medium to be installed on each information communication terminal. The agent program can also be implemented on an application server connected to a wired LAN, the Internet, or the like or the management server 11, be read therefrom, and then installed on the information communication terminal.

The information communication terminals 13, 14 and 15 are connected to the wireless LAN through the access point 12 or another information communication terminal and thus can exchange information with each other, A radio wave in a 2.5 GHz band can be used for the communication between the information communication terminals. When the information communication terminals are in a short distance from several meters to tens of meters, Bluetooth (registered trademark) can be used for the communication therebetween. In addition, infrared communication and optical communication can be performed.

In the wireless LAN, a service set ID (SSID) and an extended SSID (ESSID) are used as identification information for terminal grouping in wireless LAN connection and in authentication. Thus, the access point 12 and the information communication terminals 13, 14 and 15 have SSIDs set therefor, but are each configured to be connected to the wireless LAN only when there is a match in the SSID or the like.

The wireless LAN performs communications using radio waves, and thus has a high risk that a third party intercepts the radio waves. For this reason, the communications can use a security guide such as a password called a network key, and encryptions based on wired equivalent privacy (WEP), Wi-Fi protected access (WPA), WPA2, IEEE802.11i, and the like.

The DHCP server 16 includes a storage device, a processor, and a communication interface, like the management server 11. The DHCP server 16 further includes an input device and a display device as needed. The DHCP server 16 assigns an IP address to the information communication terminal 13 connected to the wired LAN 10 on the basis of the IP address ranges of the areas set in the range information database. In the aforementioned network environment in which the wired LANs are mutually connected by the router, the router can have the function of the DHCP server to assign a predetermined range of IP addresses to each area.

When being connected to the wired LAN 10 by using a LAN cable, the information communication terminal 13 sends the wired LAN 10 a user datagram protocol (UDP) packet for broadcasting which includes a destination IP address of, for example, 255.255.255.255. The UDP packet includes a MAC address of a transmission source. The DHCP server 16 receives the UDP packet, refers to a management table storing leased IP addresses and MAC addresses of leased terminals in association with one another, selects an unleased IP address one by one, updates the management table, and transmits the selected IP address to the information communication terminal 13 based on the MAC address to cause the information communication terminal 13 to set the IP address set for itself. The DHCP server 16 assigns the IP address to the information communication terminal 13 in this manner.

Next, by referring to FIG. 8, a description is given of a detailed configuration of the management server 11 included in the location estimation system shown in FIG. 4 and processing performed by the management server 11. FIG. 8 is a functional block diagram of the management server 11. The management server 11 manages the databases as shown in FIGS. 5 to 7. The databases may be provided externally in separation from the management server 11 or may be incorporated into the management server 11. In the embodiment shown in FIG. 8, the databases are incorporated into the management server 11.

In this embodiment, the management server 11 includes a terminal database 20, a range information database 21, and a PAP database 22. The management server 11 further includes a receiver 23, a transmitter 24, a location estimating unit 25, and an instruction issuing unit 26. As described by referring to FIGS. 5 to 7, the terminal database 20 stores terminal identification information and location information of an information communication terminal in association with each other. The range information database 21 stores location information of a general place and a range of network addresses thereof in association with each other. The PAP database 22 stores therein terminal identification information and location information of a PAP-functioning information communication terminal in association with each other. Note that a hard disk drive (FIDD) or the like which is a storage device included in the management server 11 can be used for the databases.

The receiver 23 and the transmitter 24 are implemented by the communication interface. The receiver 23 receives information transmitted from the information communication terminals 13, 14 and 15. The transmitter 24 transmits an instruction issued by the instruction issuing unit 26 to, for example, the information communication terminal 13 connected to the wired LAN. Communication with the information communication terminal 13 is performed by using an appropriate protocol such as transport control protocol/Internet protocol (TCP/IP) as well as a terminal name, a MAC address, and an IP address which are terminal identification information of the information communication terminal 13. When the management server 11 communicates with the information communication terminal 13 via the router, the router performs routing for a packet from the management server 11 by using route information held in the router itself and sends the packet to the target information communication terminal 13.

Upon receipt of the terminal identification information from the information communication terminal 13 connected to the wired LAN, the receiver 23 sends the terminal identification information to the location estimating unit 25. Upon receipt of the terminal identification information, the location estimating unit 25 refers to the range information database 21 to generate location information of the information communication terminal 13. Since the terminal identification information includes an IP address, the location estimating unit 25 refers to the IP address ranges in the range information database 21, checks which range includes the IP address, acquires location information (of a building, a floor, and an area) corresponding to the range, and generates location information of the information communication terminal 13 in accordance with the acquired location information. The location estimating unit 25 and updates the terminal database 20 by registering the generated location information in the terminal database 20 in association with the terminal identification information of the information communication terminal 13. Examples of the terminal identification information to be associated with the generated location information are a terminal name and a MAC address as shown in FIG. 5.

In accordance with a certain rule, the instruction issuing unit 26 selects one of the information communication terminals connected to the wired LAN 10 to cause the information communication terminal to function as a PAP, and issues a mode change instruction to the selected information communication terminal, the mode change instruction being for switching to the communication mode of performing the wireless communication directly with a different one of the information communication terminals, that is, the ad-hoc mode. Although there is only one terminal connected to the wired LAN 10 which is the information communication terminal 13 in FIG. 4, there are many terminals actually. The instruction issuing unit 26 selects an appropriate terminal from among the many information communication terminals.

Figure 9:
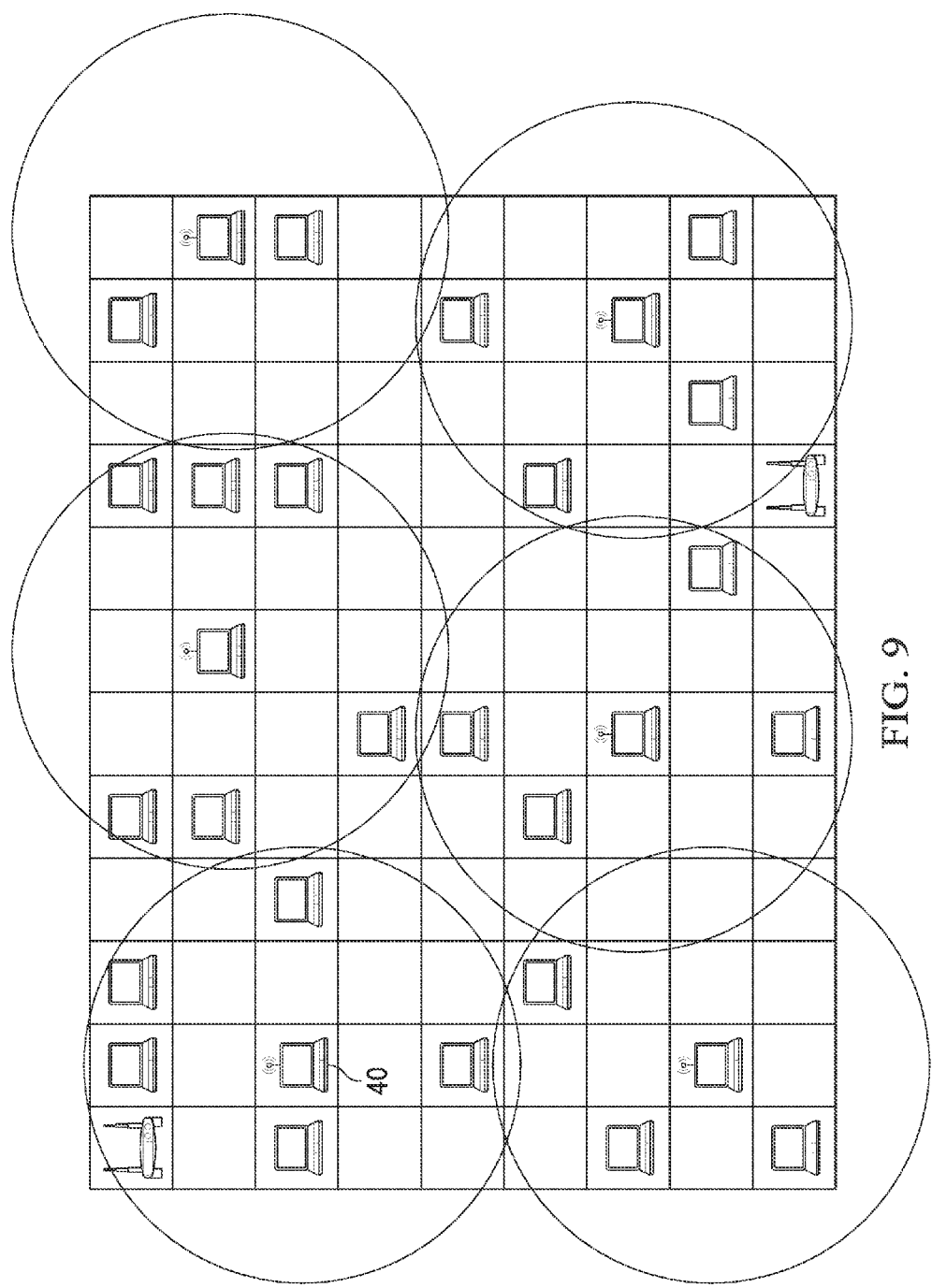
FIG. 9 is a diagram showing one example of selecting a PAP.

In an example, a method as shown in FIG. 9 can be employed in which the information communication terminal is identified based on a distance in accordance with a radio wave intensity provided to avoid interference between radio waves in a wireless LAN. Specifically, reachable ranges of radio waves from information communication terminals are measured in advance. Circles representing the respective ranges are drawn on an area map so that the circles can be placed all over the area and that overlapping portions of the circles can be minimized, and thereby the centers of the circles are identified. For example, port numbers of wired LAN ports located in the identified centers are registered in advance, and thus one of information communication terminals connected to the ports of the numbers can be identified as an information communication terminal to be selected. In an example, the wired LAN ports can be managed by a management device configured to manage the ports, by associating each port number with terminal identification information such as a MAC address of a corresponding one of the information communication terminals connected to the port. Thus, by acquiring a correspondence table of the association from the management device, the management server 11 can identify an information communication terminal located in the circle and can perform communication by using the terminal identification information.

Note that FIG. 9 shows PAP-functioning information communication terminals 40 transmitting radio waves in the respective circles. FIG. 9 also shows some information communication terminals which are connected to the wireless LAN. Selecting the PAP-functioning information communication terminals in this manner causes each of the information communication terminals connected to the wireless LAN in any location to receive a radio wave transmitted from a corresponding one of the PAP-functioning information communication terminals 40 and to transmit a measurement result to the management server 11. Thereby, the location of the information communication terminal can be estimated.

However, if no information communication terminal is connected to a LAN port, a range of the port is considered to include no PAP, and thus a location of an information communication terminal cannot be estimated. Thus, it is also possible to register wired LAN port numbers in order from the port closest to the center of a corresponding circle and then to select one of the information communication terminals which is connected to a wired LAN port having the highest priority number.

In another example, since several neighboring users often connect to the wired LAN at the same time, a method by which one of four terminals connected to the wired LAN is selected may be employed from a rule of thumb. This is because three of the information communication terminals connected at the same time exist closest to a different information communication terminal selected as the PAP, and locations of the three information communication terminals can be easily estimated from location information of the PAP. This example uses four information communication terminals, but the number of information communication terminals is not limited thereto. A method may be employed by which an information communication terminal is selected from among two, three, five, or more information communication terminals connected at the same time.

Figure 10:
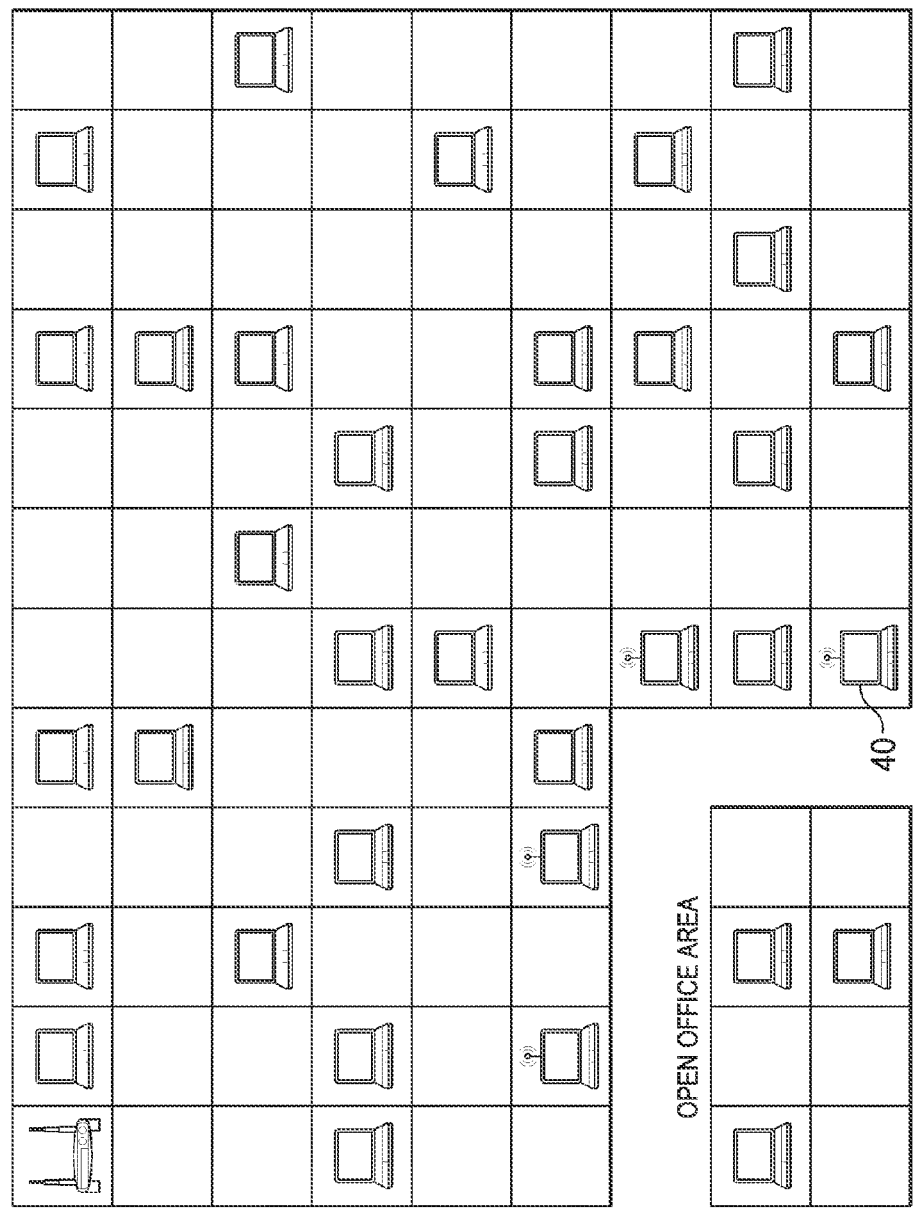
FIG. 10 is a diagram showing another example of selecting a PAP.

Meanwhile, in a case where an open office area with no wired LAN port exists as shown in FIG. 10, it is general that the open office area has information communication terminals which are connected to a wireless LAN. Thus, a method can also be employed by which several information communication terminals connected to LAN ports close to the open office area are selected. FIG. 10 shows that information communication terminals connected to the wireless LAN are arranged in the open office area, while information communication terminals connected to the wired LAN are arranged in the other area. FIG. 10 also shows that PAP-functioning information communication terminals 40 transmitting radio waves near the open office area.

These methods are taken as examples of a method for selecting some of information communication terminals connected to a wired LAN for setting them as PAPs. As long as appropriate information communication terminals can be selected, the method is not limited to the exemplary methods.

In accordance with a certain one of the aforementioned rules, the instruction issuing unit 26 can select the information communication terminal at regular time intervals of, for example, 5 minutes or upon restoration from a suspend.

An instruction issued by the instruction issuing unit 26 after selecting the information communication terminal 13 is a mode change instruction, which is for changing the infrastructure mode set as the communication mode of the information communication terminal 13 to the ad-hoc mode to cause the information communication terminal 13 to function as the PAP. Even if the information communication terminal 13 is set in the ad-hoc mode and has been functioning as the PAP, the instruction issuing unit 26 can issue the mode change instruction. In this case, the information communication terminal 13 having received the instruction does not change the mode, because the information communication terminal 13 is already in the ad-hoc mode.

In addition to the mode change instruction to switch to the ad-hoc mode, the instruction issuing unit 26 can issue a mode change instruction to change the ad-hoc mode set as the communication mode of the information communication terminal 13 to the infrastructure mode and thereby to cause the information communication terminal 13 to function as a non-PAP. Thus, the instruction issuing unit 26 can switch the function of the information communication terminal 13 between the PAP and the non-PAP at regular time intervals.

The instruction issuing unit 26 transmits the issued mode change instruction to the transmitter 24, and the transmitter 24 sends the mode change instruction by using an appropriate protocol such as TCP/IP as well as the terminal name, the MAC address, and the IP address which are terminal identification information of the information communication terminal 13.

When the information communication terminal 13 changes the communication mode after receiving the mode change instruction and then functions as the PAP, the receiver 23 receives radio wave intensity measurement results from the information communication terminals 14 and 15 connected to the wireless LAN, the measurement results being transmitted together with PAP identification information for identifying the PAP. At this time, the receiver 23 also receives terminal identification information of the information communication terminals 14 and 15 having transmitted the results. The receiver 23 transmits the measurement results and the like to the location estimating unit 25. The location estimating unit 25 refers to the PAP database 22 based on the measurement results and the PAP identification information and estimates locations of the information communication terminals 14 and 15 connected to the wireless LAN.

Since it is general that multiple PAP-functioning information communication terminals are selected, the location estimating unit 25 refers to the PAP database 22 based on terminal identification information of one of the PAP-functioning information communication terminals which corresponds to the highest one of measured radio wave intensities, and acquires location information associated with the terminal identification information. Then, the location estimating unit 25 sets the acquired location information as location information of the information communication terminals 14 and 15 connected to the wireless LAN and updates the terminal database 20 by registering the location information in the terminal database 20 in association with the terminal identification information.

The location estimating unit 25 and the instruction issuing unit 26 are implemented by reading and executing, by the processor, the programs stored in the storage device included in the management server 1.

Figures 11, 12:
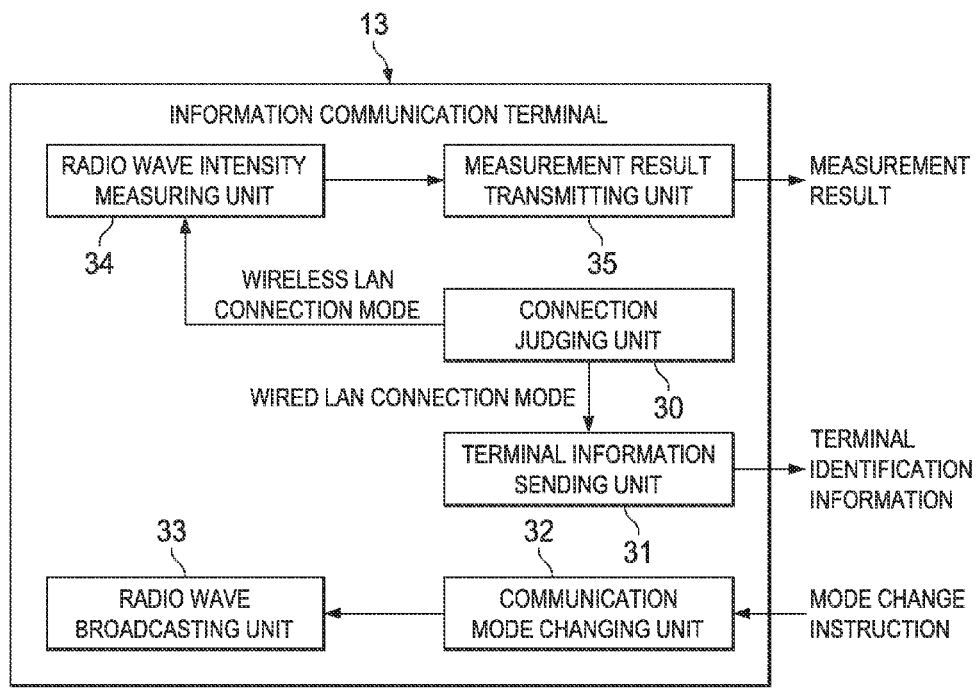
FIG. 11 is a functional block diagram of each of information communication terminals included in the location management system.
FIG. 12 is a table illustrating measurement results transmitted to the management server.

Next, a detailed configuration and processing performed by each of the information communication terminals 13, 14 and 15 included in the location estimation system shown in FIG. 4 will be described in detail by referring to FIG. 11. FIG. 11 is a functional block diagram of the information communication terminal. The agent program is installed, on the information communication terminal so as to achieve location estimation processing. The agent program is stored in the storage device included in the information communication terminal. When the processor loads and executes the agent program, the information communication terminal thereby functions as the agent means. FIG. 1 shows that the information communication terminal having the agent program installed thereon and functioning as the agent means is the information communication terminal 13. The information communication terminals 14 and 15 shown in FIG. 1 each have the agent program installed thereon, too, and function as the agent means, but a description thereof is herein omitted.

The information communication terminal 13 as the agent means includes a connection judging unit 30, a terminal information sending unit 31, a communication mode changing unit 32, a radio wave broadcasting unit 33 serving as a carrier wave broadcasting unit, a radio wave intensity measuring unit 34 serving as an intensity measuring unit, and a measurement result transmitting unit 35. The agent means may include as needed a PAP mode judging unit configured to judge whether or not the information communication terminal is set in the PAP mode, although the PAP mode judging unit is not illustrated in FIG. 11.

The information communication terminal 13 is provided with a wireless LAN adapter. The information communication terminal 13 enables or disables wireless LAN connection turning on or off the wireless LAN adapter. The connection judging unit 30 checks a network connection state of the information communication terminal 13 and judges whether or not the network connection state is the wired LAN connection. The network connection state can be judged by checking a connection mode, because the network connection state is set in a wired LAN connection mode during a time period from detection of connection of a LAN cable to a wired LAN port to detection of disconnection of the LAN cable. When the wireless LAN adapter is ON after the connection judging unit 30 judges the network connection state is the wired LAN connection mode, the connection judging unit 30 turns off the wireless LAN adapter to disable the wireless LAN connection.

Upon connection to the wired LAN 10 by connecting the LAN cable to the information communication terminal 13, the information communication terminal 13 sends the UDP packet to the DHCP server 16 so as to be assigned an IP address. The DHCP server 16 selects an unleased IP address by referring to the management table and assigns the IP address to the information communication terminal 13. The DHCP server 16 assigns "192.168.2.11" in this embodiment.

The information communication terminal 13 sets the IP address received from the DHCP server 16 for itself. The terminal information sending unit 31 of the agent means sends terminal identification information including the terminal name, the IP address, and the MAC address to the management server 11 through the wired LAN 10. The terminal information sending unit 31 uses the appropriate protocol such as TCP/IP to send the terminal identification information to the management server 11. The terminal name is "Mobile terminal 1," and the MAC address is "00-1F-BB-56-78" in this embodiment.

As described above, upon receipt of the terminal identification information, the management server 11 extracts the IP address from the terminal identification information, refers to the range information database 21 shown in FIG. 6, and thereby identifies that the location of the information communication terminal 13 is an eastern area on the 16th floor of the Tokyo building. The management server 11 inputs the information in the fields so as to register and manage the identified location as the location information. As the result, as shown in FIG. 5, "Mobile terminal 1" and "00-1F-BB-56-78" are inputted in the terminal name field; "Tokyo," in the building field; "16F," in the floor field; and "East," in the area field.

When selecting the PAP-functioning information communication terminal, the management server 11 inputs and registers terminal identification information and location information thereof in the PAP database 22 shown in FIG. 7. The PAP database 22 is updated in the next selection in such a manner that terminal identification information of information communication terminals which are not selected are deleted and terminal identification information of selected information communication terminals are overwritten.

Upon receipt of the mode change instruction issued by the management server the communication mode changing unit 32 sets an ESSID for connecting to the access point 12 in the wireless LAN connection as a particular ESSD from which assignment of the ESSID by the agent means can be judged, the ESSM being set in the wireless LAN adapter of the information communication terminal 13. The communication mode changing unit 32 then changes the infrastructure mode to the ad-hoc triode. This makes the other information communication terminals connected to the wireless LAN believe the information communication terminal 13 operating as a PAP.

When the information communication terminal 13 changes its function as the PAP, the radio wave broadcasting unit 33 broadcasts a radio wave to the other information communication terminals at regular time intervals, the radio wave being added with the terminal identification information such as the particular ESSID thus set and the MAC address of the information communication terminal 13.

If any of the other information communication terminals functions as the PAP, an ESSID different from that of the information communication terminal 13 is set as the particular ESSID, and a radio wave is sent at different timing. For this reason, the information communication terminals 14 and 15 to receive the radio wave from the information communication terminal 13 can synchronize radio wave reception and transmission timing.

Meanwhile, if the connection judging unit 30 of the information communication terminal 13 judges that the network connection state of the information communication terminal 13 is not the wired LAN connection, the wireless LAN adapter is kept ON, and the radio wave intensity measuring unit 34 measures the intensity of the radio wave broadcasted by a radio wave broadcasting unit of a different one of the information communication terminals which functions as the PAP.

The information communication terminal 13 is provided with a program for measuring a radio wave intensity, and executes the program to cause the program to operate as the radio wave intensity measuring unit 34. The radio wave intensity measuring unit 34 can measure the intensity of a detectable radio wave transmitted from any information communication terminal having the ESSID from which the information communication terminal can be judged as a PAP. In an example, the radio wave intensity measuring unit 34 can provide a threshold for a radio wave and thereby measure only a radio wave having an intensity higher than the threshold.

In this embodiment, the radio wave broadcasting unit 33 and the radio wave intensity measuring unit 34 are configured to broadcast radio waves and measure the radio wave intensities, respectively. However, the configuration is not limited thereto. An electromagnetic wave such as infrared light, visible light, and ultraviolet right, an ultrasonic wave, or the like can be used as a carrier wave to measure the intensity by broadcasting the carrier wave added with an ESSID and terminal identification information. The ultrasonic wave can be broadcasted by using a microphone or a speaker.

The radio wave intensity measured by the radio wave intensity measuring unit 34 is received by the measurement result transmitting unit 35 together with terminal identification information of an information communication terminal broadcasting the radio wave and terminal identification information of the information communication terminal 13 measuring the intensity of the radio wave, and then is transmitted to the management server 11 via the access point 12 and the wired LAN 10.

In a case where the information communication terminal 13 functions as the PAP, the information communication terminal 13 broadcasts the radio wave to the information communication terminal 14 connected to the wireless LAN. The information communication terminal 14 measures the intensity of the radio wave and sends the management server 11 a measurement result as shown in FIG. 12 together with its own terminal identification information. FIG. 12 shows a table of information that measured intensities of radio waves transmitted by the information communication terminal 13 set as the PAP and another information communication terminal are 90% and 70%, respectively, the information communication terminal 13 having the MAC address of "00-1F-BB-56-78," the other information communication terminal having a MAC address of "00-2A-CC-11-22."

Meanwhile, the intensity of the radio wave transmitted from the wireless LAN adapter of the PAP-functioning information communication terminal 13 set in the PAP mode is lower than the intensity of a radio wave transmitted from the access point 12. For this reason and because the radio wave passes through a concrete wall from a higher or lower floor, the radio wave from the information communication terminal 13 is lamely attenuated to have extremely low intensity. However, information communication located on the higher or lower floor are also included in a range of areas for measuring the radio wave intensity. To remove radio waves from the information communication terminals, a threshold is provided. It is possible to remove a radio wave having an intensity lower than the threshold and to measure a radio wave intensity only equal to or higher than the threshold Since the information communication terminal 13 broadcasting a radio wave having the highest intensity in the measured intensities exists closest to the information communication terminal 14 transmitting the measurement result, an approximate location of the information communication terminal 14 can be estimated based on the location of the information communication terminal 13.

From the above, the management server 11 receives the measurement result from the information communication terminal 14 and identifies a MAC address corresponding to the hiczhest radio wave intensity from the received measurement results. In the measurement results shown in FIG. 12, the radio wave intensity showing 90% is the highest. The management server 11 refers to the MAC address corresponding to the intensity and thereby identifies "0-1F-BB-56-78." Then, the management server 11 refers to the PAP database 22 to acquire the terminal name and the location information of the information communication terminal 13 having the MAC address. For example, if the information communication terminal 13 having the MAC address "0-1F-BB-56-78" has the name "Mobile terminal 1" and located in the eastern area on the 16th floor of the Tokyo building, the management server 11 acquires information of "Mobile terminal 1," "Tokyo," "16F," and "East." The management server 11 calls the terminal database 20, inputs the acquired information in the fields, and updates the terminal database 20 by registering the information in the terminal database 20 as terminal identification information of the information communication terminal 13.

When attending a meeting or the like users of the information communication terminals 13, 14 and 15 move in the building with the information communication terminals 13, 14 and 15 carried with them. At this time, the LAN cable of the information communication terminal 13 is disconnected therefrom, and the information communication terminal 13 enters the wireless LAN connection mode and is located in a different place. The information communication terminals 13, 14 and 15 are also located in different places.

Nevertheless, the location estimation system performs location estimation processing at regular time intervals, and thus can manage latest information by updating the terminal database 20 and the PAP database 22 at the regular time intervals. Note that any time interval can be set for the processing.

Even if the location estimation system is located inside a building where a radio wave from a GPS satellite is not receivable, the location estimation system can estimate the location of an information communication terminal connected to a wireless LAN and apply the location to various services using location information thereof. In addition, at an occasion of finding someone, the location of an information communication terminal carried with the person is estimated, and thereby the location of the person at the time can be identified.

Recently, power saving has been encouraged due to a problem of global warming, and thus has been promoted by businesses and the like. By estimating the location of an information communication terminal in such a manner, a place where nobody is present is found, and the light is turned off in the place, for example. This can enhance the power saving effect. In addition, in the place where nobody is present air conditioning power is reduced, and the number of fluorescent lamps to turn on is reduced. These can enhance the power saving effect.

The processing of estimating the location of an information communication terminal connected to the wireless LAN and set in the wireless LAN connection mode has been described by referring to the system configuration shown in FIG. 4, the databases shown in FIGS. 5 to 7, and the information shown in FIG. 12. In performing the processing, as described above, each of the information communication terminals 13, 14 and 15 has the agent program installed thereon, and functions as the agent means by executing the agent program. The agent means executes processing of sending terminal identification information to the management server 11, receiving a communication mode change instruction, changing the communication mode, measuring a radio wave intensity, and sending a measurement result to the management server 11. Hence, the processing performed by the agent means will be described in detail by referring to FIGS. 13 to 16.

Figure 13:
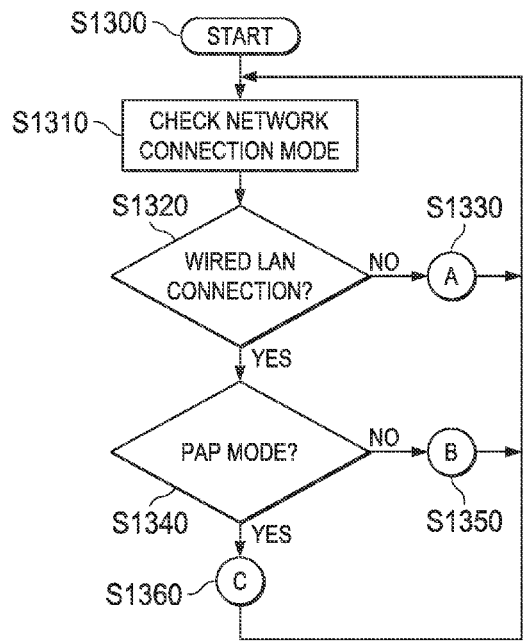
FIG. 13 is a flowchart showing a flow of overall processing performed by the information communication terminal.

FIG. 13 is a flowchart showing main processing performed by the agent means. The agent means starts the processing from Step 1300 and functions as the agent means in Step 1310. For example, the agent means checks a network communication mode of the information communication terminal 13. The network connection mode is either the wired LAN connection mode in which the information communication terminal 13 is connected to the wired LAN or the wireless LAN connection mode in which the information communication terminal 13 is connected to the wireless LAN. The modes can be checked based on the LAN connection mode set in the information communication terminal 13.

In Step 1320, it is judged whether or not the information communication terminal 13 is connected to the wired LAN by checking the LAN connection mode set therein. If the information communication terminal 13 is judged not to be connected to the wired LAN, the processing proceeds to Step 1330. If the information communication terminal 13 is judged to be connected to the wired LAN, the processing proceeds to Step 1340. In Step 1330, the information communication terminal 13 performs processing of measuring an intensity of a radio wave from a neighboring PAP and sending a measurement result to the management server 11, because the information communication terminal 13 is connected to the wireless LAN. The processing will be described later. Then, the processing returns to Step 1310. This means that if the wireless LAN connection is continued, processing in Steps 1310, 1320, 1330 is repeated.

In Step 1340, it is judged whether or not the information communication terminal 13 is set in the PAP mode. If it is judged that the information communication terminal 13 is not set in the PAP mode, the processing proceeds to Step 1350. The information communication terminal 13 receives a mode change instruction from the management server 11 to execute processing of changing to the PAP mode, and then the processing returns to Step 1310. Accordingly, in Step 1310, it is checked that the information communication terminal 13 is in the wired LAN connection mode. In Step 1320, it is judged that the information communication terminal 13 is connected to the wired LAN. In Step 1340, it is judged that the information communication terminal 13 is set in the PAP mode. This means that the agent means then proceeds to Step 1360.

If it is judged that the information communication terminal 13 is set in the PAP mode in Step 1340, the agent means also proceeds to Step 1360. The information communication terminal 13 broadcasts a radio wave to the information communication terminals 14 and 15 set in the wireless LAN connection mode, and causes each of the information communication terminals 14 and 15 to execute processing of measuring an intensity of the radio wave and sends a measurement result to the management server 11. Then, the processing returns to Step 1310. While the information communication terminal 13 is set in the PAP mode, the processing in Steps 1310, 1320, 1340, and 1360 is repeated.

Figure 2:
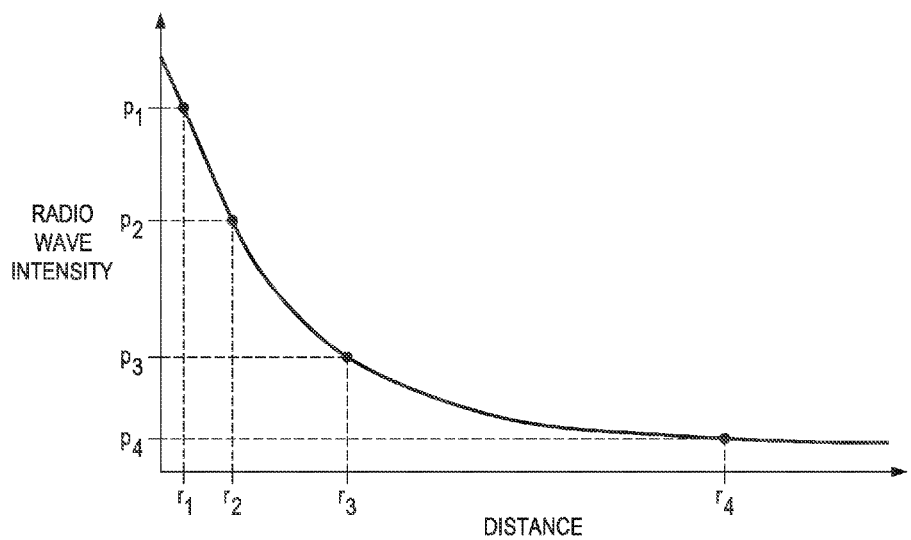
FIG. 2 is a graph showing a relationship between an intensity of a radio wave and a distance, the radio wave being received from each of nodes by an end point, the distance being between each node and the end point.
Figure 3:
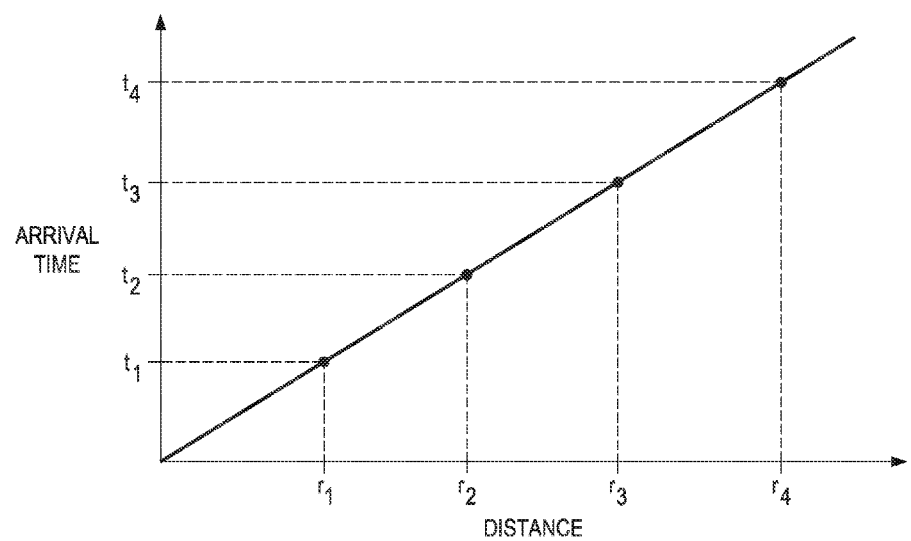
FIG. 3 is a graph showing a relationship between a time difference and a distance, the time difference being between a time of transmitting a radio wave by each node and a time of receiving the radio wave by the end point, the distance being between each node and the end point.
Figure 14:
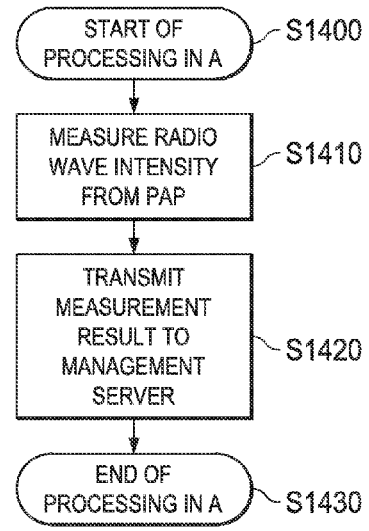
FIG. 14 is a flowchart showing a flow of processing performed by the information communication terminal in a wireless LAN communication mode.

FIG. 14 is a flowchart illustrating the details of the processing performed in Step 1330. When the processing proceeds to Step 1330, processing to be executed by the information communication terminal 13 in the wireless LAN connection mode is started from Step 1400. In Step 1410, upon receipt of a radio wave broadcasted by a PAP-functioning information communication terminal neighboring the information communication 13, the radio wave intensity measuring unit 34 of the information communication terminal 13 measures the intensity of the radio wave. The radio wave intensity is attenuated nearly in inverse proportion to a distance as shown in FIG. 2. Thus, a radio wave from a PAP in a short distance has a high intensity, and a radio wave from a PAP in a longer distance has a lower intensity.

As described above, a received radio wave is not limited to a radio wave from a PAP on the same floor, but includes radio waves from PAPs on the higher and lower floors. However, the radio waves from the higher and lower floors are largely attenuated after passing through a concrete wall. Thus, a threshold for a radio wave intensity is provided, and only radio wave intensities equal to or higher than the threshold are measured. Thereby, it is possible to cut off such radio waves from the higher and lower floors and thus to detect only a radio wave from the PAP on the same floor to measure the radio wave intensity. In addition, another control of radio wave detection can be implemented in which a radio wave broadcasting unit of each of PAP-functioning information communication terminals controls an intensity of a broadcasted radio wave, for example, by broadcasting an extremely low radio wave to prevent detection of a radio wave from a PAP in a different room shielded by a higher or lower floor or a wall. Thereby, only a radio wave from a PAP on the same floor can be detected.

In Step 1420, the measurement result transmitting unit 35 sends the management server 11 a result of measuring the intensity of the radio wave broadcasted by the PAP-functioning information communication terminal, in association with terminal identification information of the information communication terminal broadcasting the radio wave. In an example, the table as shown in FIG. 12 listing radio wave intensities in a descending order is employed. The measurement result transmitting unit 35 transmits the measurement result added with terminal identification information of the information communication terminal 13 which is a transmission source of the result. Since the information communication terminal 13 is set to communicate with the management server 11 in the infrastructure mode via the access point 12, the measurement result transmitting unit 35 can transmit the measurement result to the management server 11 via the access point 12. Upon completion of the transmission, in Step 1430 the information communication terminal 13 terminates the processing executed in the wireless LAN connection mode. Thereafter, the processing returns to Step 1310 in FIG. 13.

Figures 15, 16:
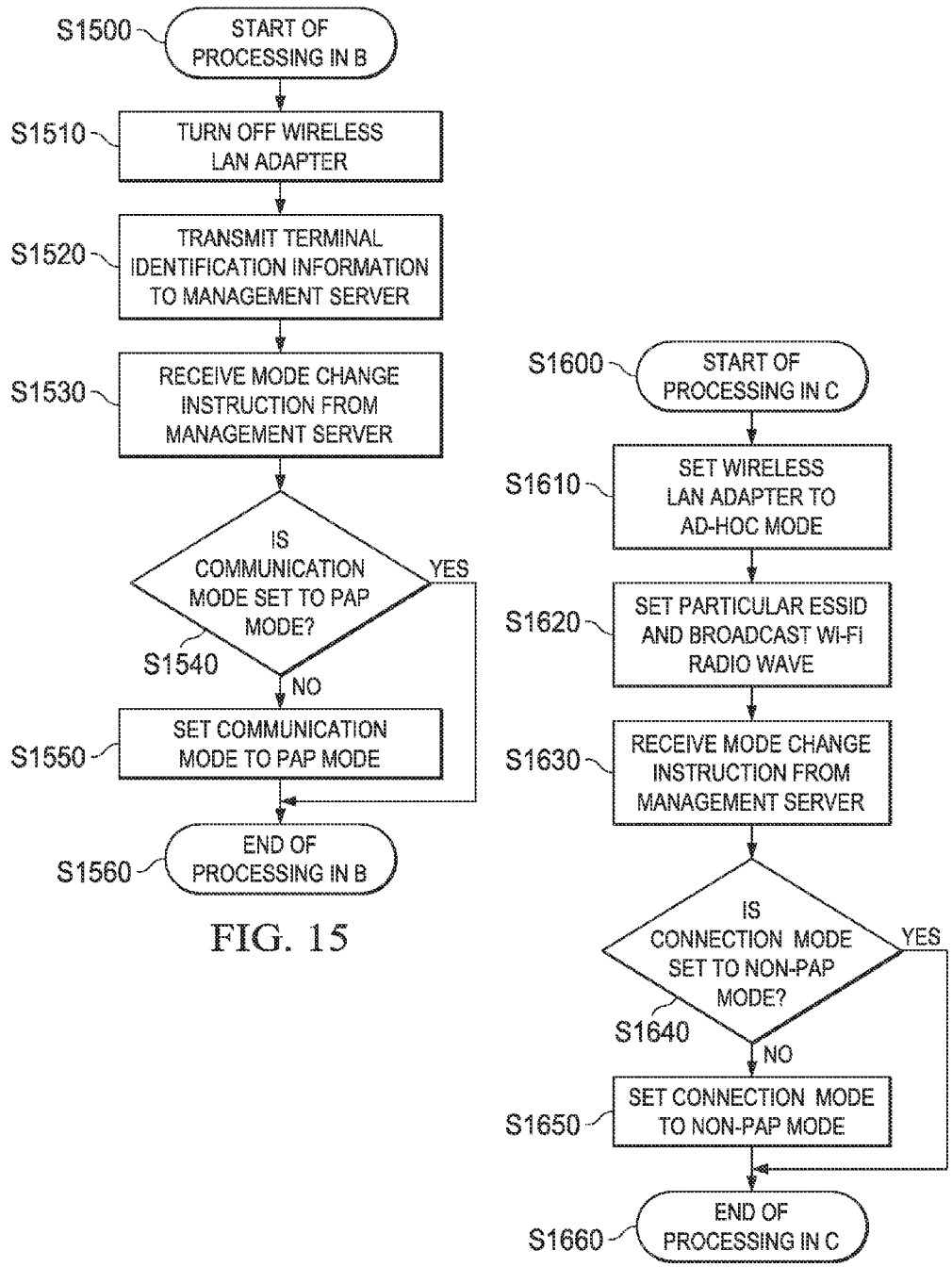
FIG. 15 is a flowchart showing a flow of processing performed by the information communication terminal in a non-PAP mode in a wired LAN communication mode.
FIG. 16 is a flowchart showing a flow of processing performed by the information communication terminal in a PAP mode in the wired LAN communication mode.

FIG. 15 is a flowchart illustrating the details of the processing performed in Step 1350. When the processing proceeds to Step 1350, processing to be executed in a case where the information communication terminal 13 is in the wired LAN connection mode and is not set in the PAP mode is started from Step 1500. In Step 1510, since the wireless LAN adapter is ON immediately after establishment of connection to the wired LAN, the information communication terminal 13 functioning as the agent means turns off the wireless LAN adapter to stop the wireless LAN connection.

In Step 1520, the terminal information sending unit 31 of the information communication terminal 13 acquires an IP address assigned to the information communication terminal 13, the MAC address, and the terminal name from a setting file or the like held by the information communication terminal 13, configures the information as terminal identification information, and transmits the terminal identification information to the management server 11. The information communication terminal 13 is already connected to the wired LAN at this time, and thus can transmit the terminal identification information to the management server 11 via the wired LAN 10 by using the IP address of the management server 11.

The information communication terminal 13 connected to the wired LAN does not execute processing as the agent means until the information communication terminal 13 receives a mode change instruction to switch to the PAP mode from the management server 11. Before receiving the mode change instruction, the information communication terminal 13 can execute processing other than the processing as the agent means, such as creating an e-mail or a document.

In Step 1530. The information communication terminal 13 receives the mode change instruction to switch to the PAP mode transmitted by the management server 11. Then, the processing proceeds to Step 1540 in which the communication mode changing unit 32 judges whether or not the communication mode is already set to the PAP mode. If the mode is set to the PAP mode, the processing proceeds to Step 1560 to terminate the processing. On the other hand, if the mode is not set to the PAP mode, the processing proceeds to Step 1550 in which the communication mode changing unit 32 changes the mode to the PAP mode. In Step 1560, the processing is terminated. Thereafter, the processing returns to Step 1310 shown in FIG. 13.

FIG. 16 is a flowchart illustrating the details of the processing performed in Step 1360. When the processing proceeds to Step 1360, processing to be executed in a case where the information communication terminal 13 is in the wired LAN connection mode and set in the PAP mode is started from Step 1600. In Step 1610, since the communication mode of the wireless LAN adapter is the infrastructure mode immediately after the setting to the PAP mode in FIG. 15, the communication mode changing unit 32 changes the communication mode to the ad-hoc mode. Specifically, the communication mode changing unit 32 turns on the ad-hoc mode.

When the communication mode is changed to the ad-hoc mode, in Step 1620 the radio wave broadcasting unit 33 sets a particular ESSID from which assignment of the ESSID by the agent means can be judged, and broadcasts the example, a wireless fidelity (Wi-Fi) radio wave. The radio wave can be broadcasted at regular time intervals.

In the information communication terminal 13 connected to the wired LAN, the processing by the radio wave broadcasting unit 33 is continued until the information communication terminal 13 receives the mode change instruction to switch to the non-PAP mode from the management server 11. While the processing is continued, the information communication terminal 13 can execute processing other than that the processing as the agent means, such as creating an e-mail or a document.

In Step 1630, the information communication terminal 13 receives the mode change instruction to switch to the non-PAP mode transmitted by the management server 11. Then, the processing proceeds to Step 1640 in which the communication mode changing unit 32 judges whether or not the communication mode is already set to the non-PAP mode. If the mode is set to the non-PAP mode, the processing proceeds to Step 1660 to terminate the processing. On the other hand, if the mode is not set to the non-PAP mode, the processing proceeds to Step 1650 in which the communication mode changing unit 32 changes the mode to the non-PAP mode. In Step 1660, the processing is terminated. The mode can be changed to the non-PAP mode by cancelling the setting of the PAP mode, such as setting the PAP mode to off. Thereafter, the processing returns to Step 1310 shown in FIG. 13.

According to the illustrative embodiments as described, above, the management server 11 manages the multiple information communication terminals 13, 14 and 15 and dynamically sets up a PAP. This enables information acquisition, radio wave interference, and the like according to the floor layout.

Figure 17:
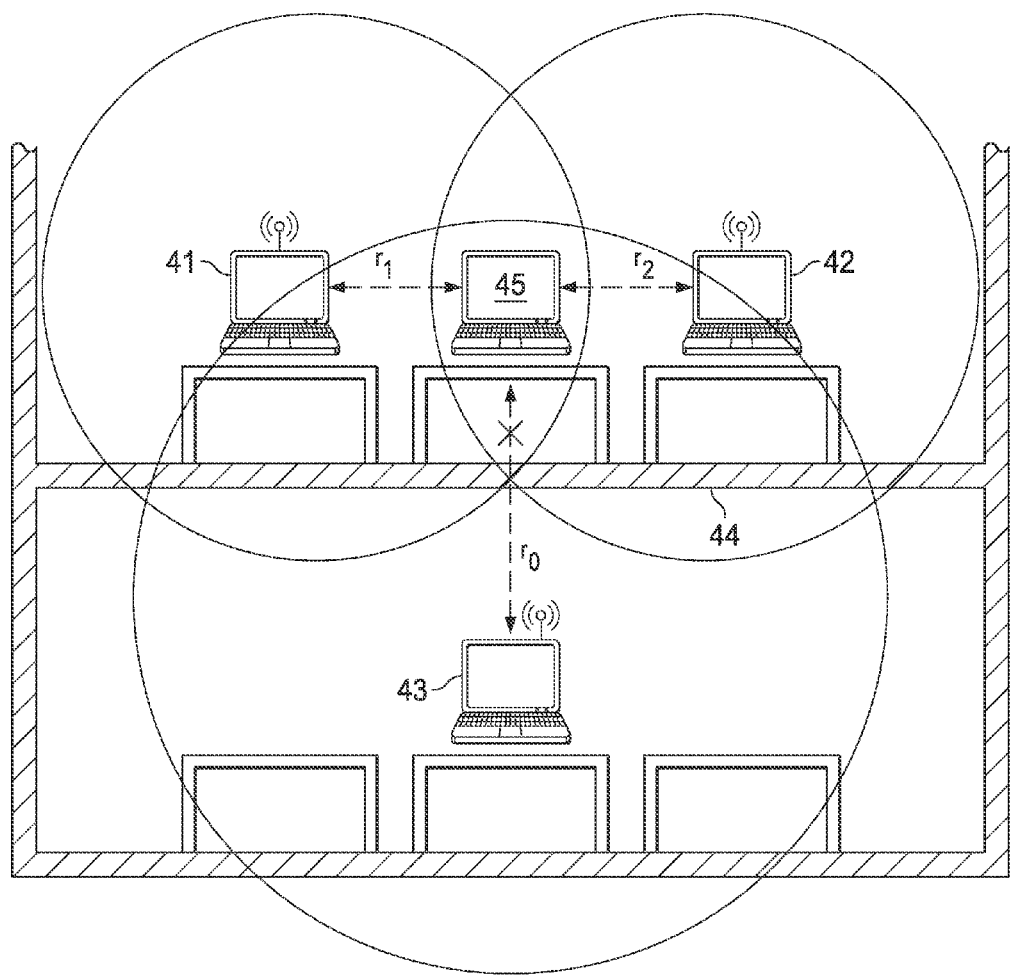
FIG. 17 is a diagram showing that a location of an end point is being estimated.

Moreover, since the radio wave broadcasted from an information communication terminal used as the PAP is not used for actual communication, the intensity thereof can be freely set under control of the agent means. Thus, as shown in FIG. 17, intensities of radio waves broadcasted by PAPs 41, 42, and 43 are daringly made small, and attenuation due to a wall or a floor 44 is utilized, so that an information communication terminal 45 connected to a wireless LAN receives radio waves from the PAPs 41 and 42 located on the same floor or room. This makes it easier to identify a floor or a room where the information communication terminal 45 is present.

When being connected to the wired LAN, each of information communication terminals is used with a LAN cable connected to a wired LAN port. Since the information communication terminal with the LAN cable is often placed on the desk, it can be assumed that any PAP is located at a height h of the desk. Thereby, location information can be easily be identified by using two-dimensional coordinates of x and y, A conventional method requires measurement of radio wave intensities from four access points and solving of simultaneous equations constituted of four equations as shown in the Formula 1 above. However, the present invention only requires measurement of intensities from three access points and solving of simultaneous equations constituted of three equations to obtain location coordinates, because the height of the PAP is h which is constant.

Moreover, in the case of the wireless LAN connection, the present invention makes it possible to perform communication through an existing wireless LAN network which is set in the infrastructure mode and which utilizes the access point 12, and possible to achieve the communication without any new additional hardware by using existing hardware such as a wireless LAN adapter included in an information communication terminal. Further, the location of the information communication terminal can be estimated from location information of a PAP, and thus steps of registering in advance and managing location information of the access point 12 are not required.

The processing and the method described above which are performed by the information communication terminals and the location estimation system are applicable to a case where port numbers of the wired LAN ports which are wired network connection ports are registered in advance and appropriately managed so that locations of the ports can be identified. That is, the appropriate management of the wired LAN ports makes it possible to select an information communication terminal connected to a particular port and to make the selected information communication terminal function as the PAP. If the wired LAN ports are appropriately managed in such a manner in any office, what is required is only the aforementioned processing and the method. However, there are in reality many offices without such appropriate management. Since an information communication terminal connected to a particular port cannot be selected under such circumstances, radio waves in the same channel are used in neighboring areas, so that radio wave interference might occur. Moreover, since PAPs cannot be set appropriately under such circumstances, radio waves from all the PAPs do not reach information communication terminals depending on the locations of the information communication terminals, so that locations might not be estimated.

If many of the information communication terminals connected to the wired LAN are caused to function as PAPs, the problem that the radio waves do not reach can be solved. However, the number of usable radio wave channels is limited. If radio waves in the same or neighboring channels are used, the aforementioned radio wave interference occurs. From a viewpoint of office management, what is needed is not absolute location coordinates but just determination of locations of the information communication terminals on a management area basis.

Thus, if the wired LAN ports are not appropriately managed as described above, the setting of the management server 11 is changed, and an agent program matching the setting is installed on each information communication terminal. Thereby, even though the locations of the wired LAN ports are not registered in advance, the locations of the information communication terminals can be identified. The management server 11 requires the setting change only, and thus can have a configuration including functional units similar to those shown in FIG. 8. Moreover, each information communication terminal having the agent program installed thereon can also function as the agent means and have a configuration including functional units similar to those shown in FIG. 11.

The management server 11 selects information communication terminals which are connected to the wired LAN and registered, one by one, and issues a mode change instruction to each selected information communication terminal to make the information communication terminal function as a PAP. The mode change instruction is an instruction to switch to the ad-hoc mode and issued by the instruction issuing unit 26 included in the management server 11.

Out of the information communication terminals connected to the wired LAN, the information communication terminals not functioning as PAPs each only transmit an assigned IP address and terminal identification information and do not perform any other operation in the embodiment described above. However, in addition to this in this embodiment, the radio wave intensity measurement unit of each information communication terminal measures an intensity of a radio wave broadcasted from one of the information communication terminals which functions as the PAP. Although the radio wave intensity measurement unit of every information communication terminal connected to the wired LAN attempts to measure the radio wave intensity, any one of the information communication terminals which is located in an area where the radio wave does not reach cannot measure the radio wave, and thus does not transmit a measurement result to the management server 11. The measurement result transmitting unit of each of the information communication terminals succeeding in measuring the radio wave intensity transmits a measurement result, the management server 11 terminal identification information added with the radio wave, and terminal identification information of the information communication terminal itself having transmitted the measurement result.

Figure 18:
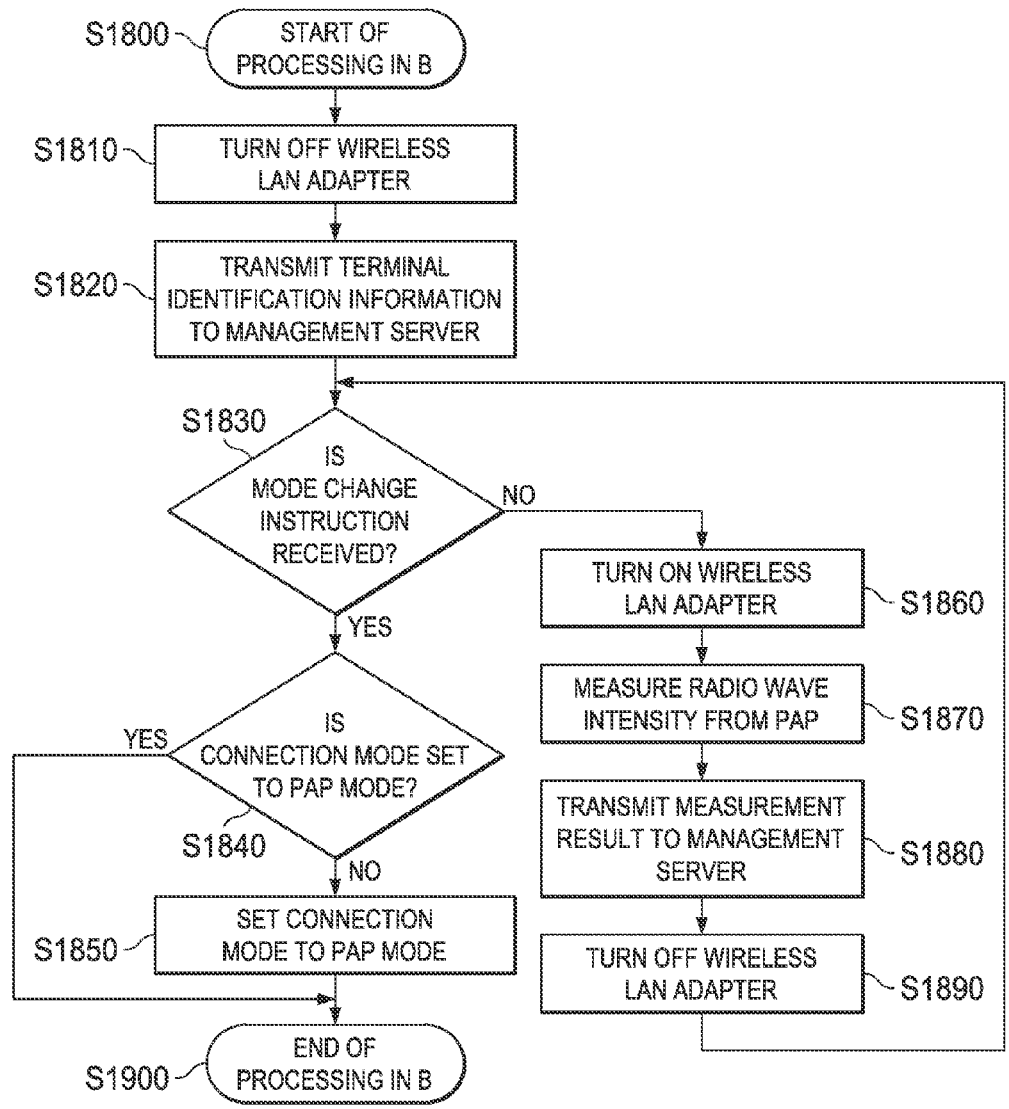
FIG. 18 is a diagram showing another flow of processing performed by the information communication terminal in anon-PAP mode in a wired LAN communication mode.

Each information communication terminal performs the same processing as that shown in FIGS. 13, 14, and 16. However, the information communication terminal executes the processing different from the processing shown in FIG. 15 in a point that when the information communication terminal is connected to the wired LAN and does not function as the PAP, the information communication terminal executes the processing of measuring the radio wave intensity and sending a result to the management server 11. The processing flow will be described by referring to a flowchart shown in FIG. 18. In this embodiment, if the mode is judged not to be the PAP mode in the flowchart shown in FIG. 13, processing is started from Step 1800.

In this flow, processing to be executed. When the information communication terminal 13, for example, is in the wired LAN connection mode and is not set in the PAP mode is started. In Step 1810 as in the processing shown in FIG. 15, the wireless LAN adapter is ON immediately after establishment of the wired LAN connection, and thus the information communication terminal 13 functioning as the agent means turns off the wireless LAN adapter to stop the wireless LAN connection.

In Step 1820, the terminal information sending unit 31 of the information communication terminal 13 acquires an IP address assigned to the information communication terminal 13 by the DHCP server 16 and the MAC address and the terminal name of the information communication terminal 13 from a setting file or the like held by the information communication terminal 13, configures the information as terminal identification information, and transmits the terminal identification information to the management server 11. The information communication terminal 13 is already connected to the wired LAN at this time, and thus can transmit the terminal identification information to the management server 11 via the wired LAN 10 by using the IP address of the management server 11.

Processing thereafter is different from the processing shown in FIG. 15. In Step 1830, it is judged whether or not the information communication terminal 13 receives a mode change instruction to switch to the PAP mode. If the information communication terminal 13 receives the mode change instruction to switch to the PAP mode transmitted by the management server 11, the processing proceeds to Step 1840 in which the communication mode changing unit 32 judges whether or not the mode is already set to the PAP mode. If the mode is already set to the PAP mode, the processing proceeds to Step 1900 and then is terminated. On the other hand, if the mode is not set to the PAP mode, the processing proceeds to Step 1850 in which the mode is changed to the PAP mode. In Step 1900, the processing is terminated. Thereafter, the processing returns to Step 1310 shown in FIG. 13.

On the other hand, if it is judged in Step 1830 that the information communication terminal 13 does not receive the mode change instruction, the processing proceeds to Step 1860 in which the wireless LAN adapter is turned on and becomes ready for receiving a radio wave. In Step 1870, the radio wave intensity measuring unit 34 of the information communication terminal 13 measures an intensity of a radio wave broadcasted by a different information communication terminal functioning as the PAP. In Step 1880, the measurement result transmitting unit 35 of the information communication terminal 13 sends the management server 11 a measurement result together with terminal identification information of the information communication terminal broadcasting the radio wave and terminal identification information of the information communication terminal 13. Thereafter, in Step 1890 the wireless LAN adapter is turned off. The processing returns to Step 1830 to again judge Whether or not the information communication terminal 13 receives a mode change instruction.

The receiver 23 of the management server 11 receives the measurement result and the aforementioned two pieces of terminal identification information from each information communication terminal having succeeded in the radio wave intensity measurement, and passes them on to the location estimating unit 25. Based on the radio wave intensity which is the measurement result received from the receiver 23, the location estimating unit 25 calculates a distance between the information communication terminal functioning as the PAP identified from the terminal identification information and broadcasting the radio wave and the information communication terminal measuring the intensity of the radio wave. The location estimating unit 25 holds the graph showing the relationship between a radio wave intensity and a distance as shown in FIG. 2, the formulas, association information such as the correspondence table, and calculates the distance by using the association information.

Figures 19, 20:
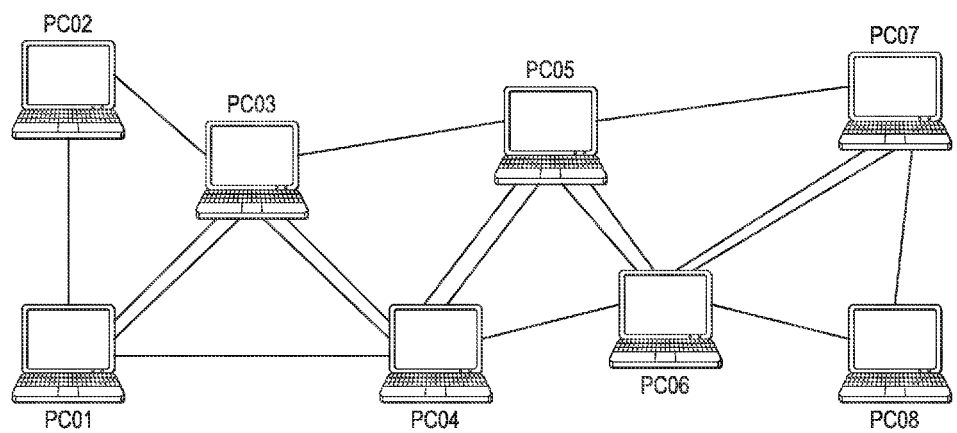
FIG. 19 is a table illustrating first distance information.
FIG. 20 illustrates a relative positional relationship chart.

The location estimating unit 25 stores and manages the calculated distance as first distance information in the storage device of the management server 11 in association with the aforementioned two pieces of the terminal identification information. The first distance information may be stored and managed in a separately provided database. FIG. 19 illustrates the first distance information. FIG. 19 shows a correspondence table of the first distance information. The correspondence table is configured such that terminal identification information of a PAP-functioning information communication terminal is inputted in an input field of "device ID 1," terminal identification information of an information communication terminal measuring an intensity of a radio wave broadcasted from the PAP is inputted in an input field of "device ID 2," and a calculated distance between the two information communication terminals is inputted in an input field "distance." In FIG. 19, terminal identification information of "PC01" is inputted in the input field of "device ID 1," terminal identification information of "PC02" is inputted in the input field of "device ID 2," and a distance of "4.5 m" is inputted in the input field of "distance."

The location estimating unit 25 selects three or more mutually neighboring information communication terminals connected to the wired LAN. Then, by using the first distance information shown in FIG. 19, the location estimating unit 25 generates a relative positional relationship chart showing a two-dimensional relative positional relationship among the information communication terminals connected to the wired LAN as shown in FIG. 20. The relative positional relationship chart shown in FIG. 20 represents the two-dimensional relative positional relationship among information communication terminals created by combining triangles each having three mutually neighboring information communication terminals located at vertices thereof. How to derive the relative positional relationship chart will be described in detail below by referring to FIG. 21.

In an example, any three information communication terminals capable of mutually receiving a radio wave are selected, and are represented by points of a, b, and c, respectively. The three information communication terminals are connected by lines to create a triangle having vertices of a, b, and c by using the first distance information, the lines being reduced at any percentage in proportion to the distances between the information communication terminals. The three information communication terminals are selected so that the triangle can have the largest or smallest area, or each of sides of the triangle is the longest or shortest. Note that the reduction percentage is the same reduction percentage of a floor map.

An information communication terminal capable of receiving a radio wave from all the three information communication terminals located at the vertices a, b, and c of the created triangle is selected one by one. Then, based on the distance between the selected information communication terminal and each of the information communication terminals at the vertices a, b, and c, a relative positional relationship between the selected information communication terminal and the triangle is calculated. Based on the positional relationship, other information communication terminals are arranged. Each of the information communication terminals having the three vertices a, b, and c is connected with each other with lines. In this manner, the chart is extended to the relative positional relationship chart shown in FIG. 20.

Figure 21:
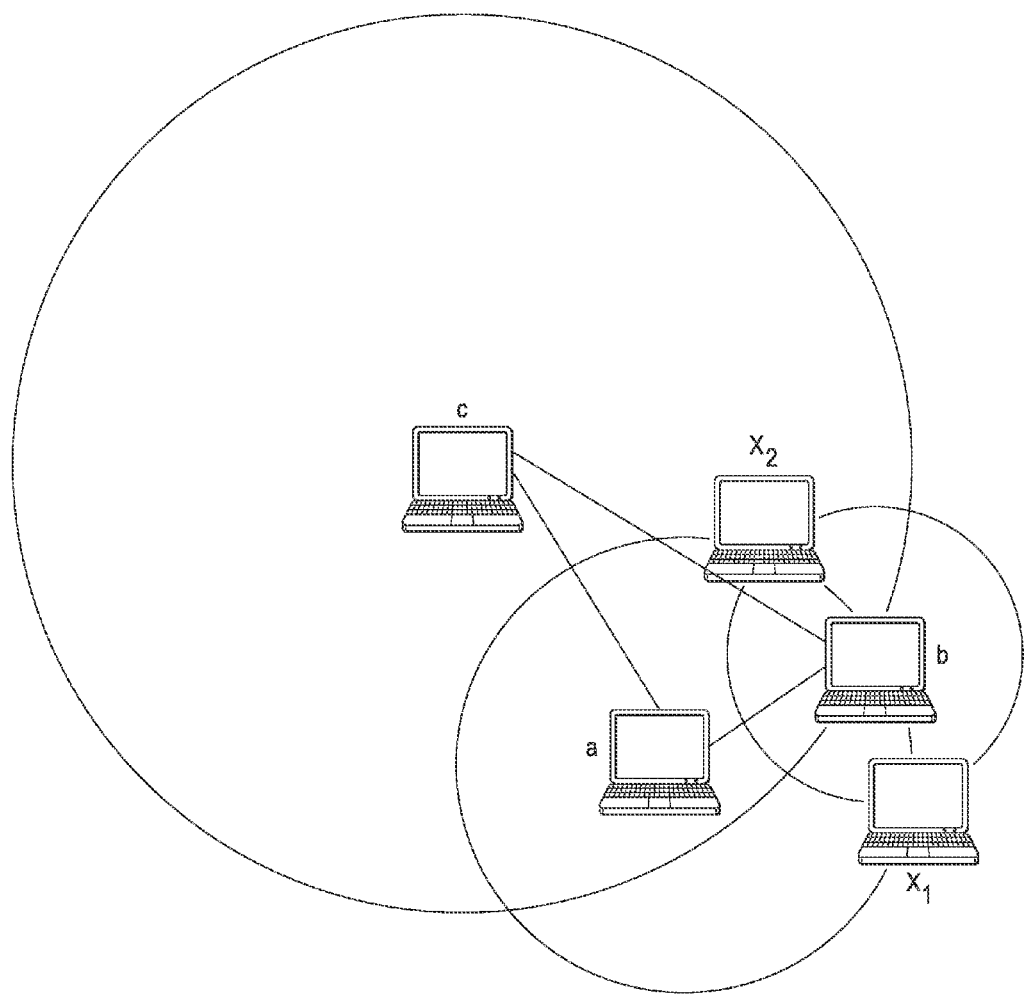
FIG. 21 illustrates the relative positional relationship chart mapped on a map.

Here, a description is given of how to extend the chart Any triangle in the created chart is selected, and an information communication terminal is selected one by one which is capable of receiving a radio wave only from two points forming a certain side of the selected triangle. In FIG. 21, an information communication terminal capable of receiving a radio wave only from two points a and b is denoted by x. The location of the terminal x can be identified as any one of two points $x_1$ and $x_2$ which are line-symmetric to a side ab of the triangle.

Since a radio wave from the point c can reach the points a and b, the radio wave can reach any point in a circle having a radius of a longer one of a side ca and a side cb. As described above, the terminal x can receive the radio wave only from the points a and b. Thus, if one of the points $x_1$ and $x_7$ is included in the circle, the point $x_1$ not included in the circle can be identified as located at a qualified location. The chart is extended by arranging the terminal x at the location of the identified point $x_1$, and connecting the points a and b by a line. If both the points $x_1$ and $x_2$ are not included in the circle, a qualified terminal cannot be uniquely identified, and thus no terminal is added to the chart. The processing is performed for every side of every triangle.

The aforementioned extension processing is executed every time a triangle is newly generated based on a terminal added in the above manner. The processing is repeated until no new terminal is added to the relative positional relationship chart, and thereby the relative positional relationship chart is generated as shown FIG. 20. The method for generating the relative positional relationship chart described, above is merely an example. The method for generating the relative positional relationship chart in this embodiment is not limited thereto, and any other method can be employed.

Figure 22A:
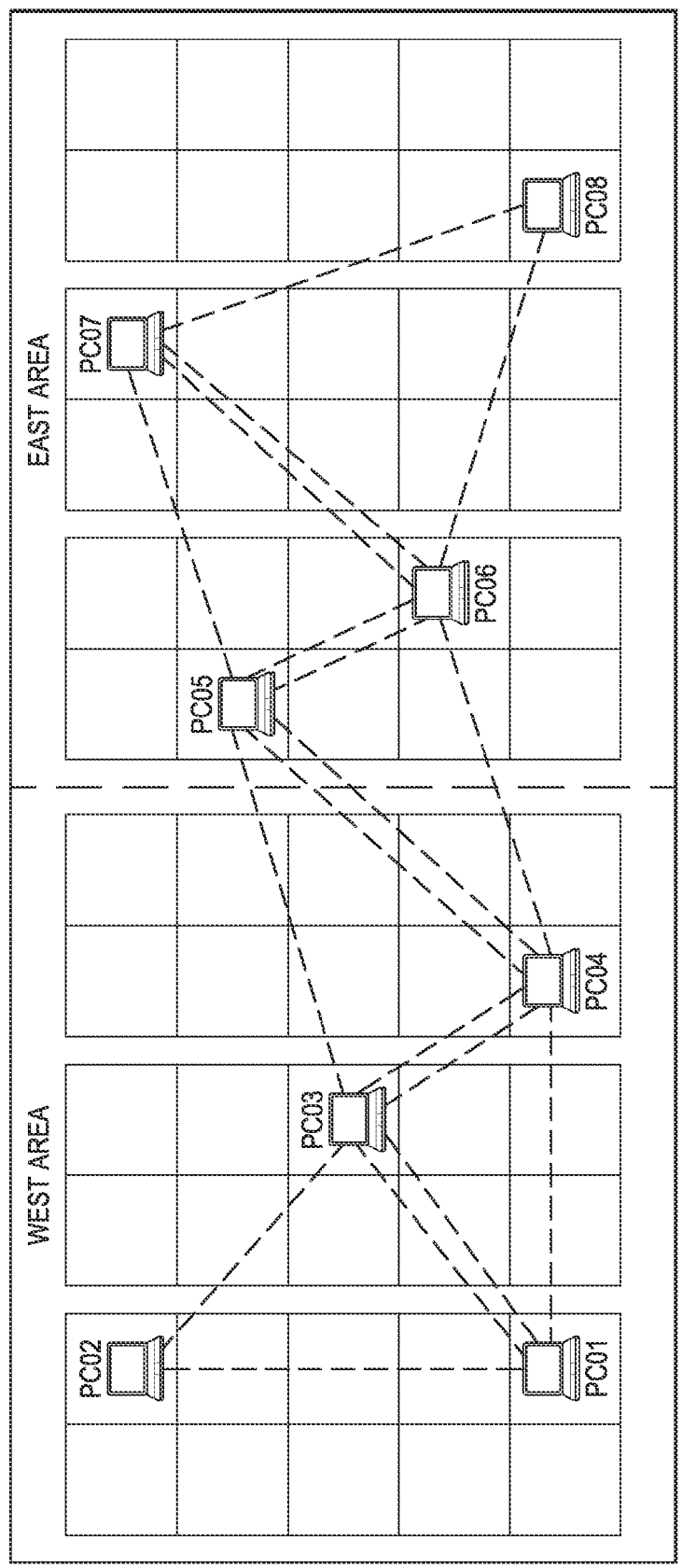
FIGS. 22A and 22B show the extended relative positional relationship chart.
Figure 22B:
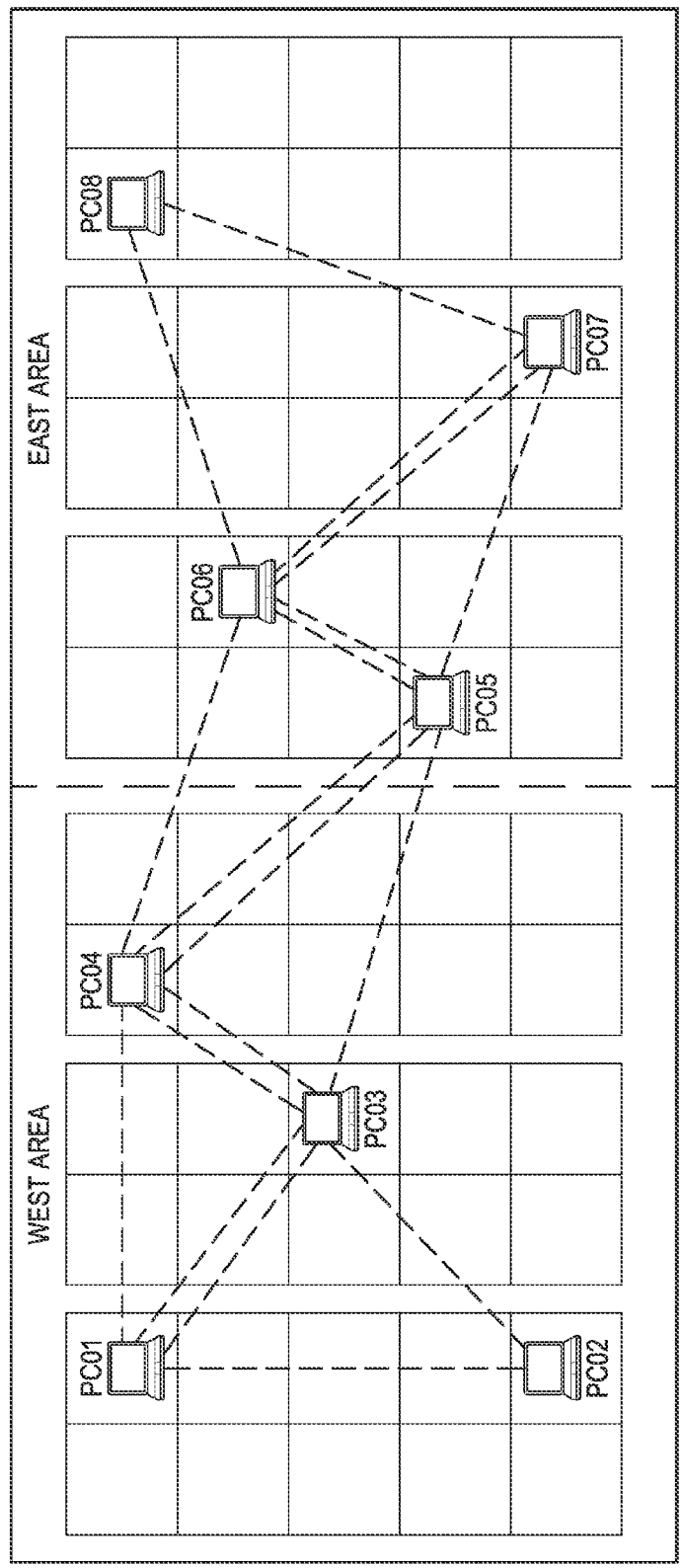

The relative positional relationship chart thus generated is mapped on a floor map of a target floor showing the arrangement of wired LAN ports as shown in FIGS. 22A and 22B. The map is generated by map data held by the management server 11. A map generated as an office design drawing can be used as the map, and the map can be stored as drawing data in the storage device or the like of the management server 11.

Examples of a mapping method include a method using a least squares method. Specifically, a distance between two of points in the relative positional relationship chart and a distance between corresponding ports are obtained, and a difference between the distances is calculated. The difference is obtained for each two information the points in the relative positional relationship chart. Then, each difference is squared, results thereof are summed, a chart arrangement having minimum sum of squares is obtained, and mapping is performed based on the arrangement. Calculating a distance based on a measurement value of a radio wave intensity causes an error with respect to an actual distance. However, by determining the chart arrangement to minimize the difference of every distance by use of the least squares method, more accurate mapping can be achieved.

Moreover, a weight is assigned to the difference of distance between two neighboring, information communication terminals according to the radio wave intensity thereof, and thereby more accurate mapping can be achieved. Since the relationship between the radio wave intensity and the distance is inversely proportional as shown in FIG. 2, the distance is calculated more accurately from a higher radio wave intensity, and less accurately from a lower radio wave. Thus, by assigning a higher weight to a distance associated with a higher radio wave intensity, the accuracy can be enhanced. The method illustrated above is also a merely example. The method in this embodiment is not limited thereto, and any other method can be employed.

The relative positional relationship chart can be mapped in this manner. However, if areas of a floor are laid out symmetrically, mapping cannot be performed uniquely. This is because in which direction of the north, south, east, and west the mapping should be performed. Hence, relative positional relationship charts in two adjacent areas are combined. By using the combined charts, it is possible to identify a chart arrangement, as shown in FIGS. 22A and 22B, including two patterns symmetrical in a direction orthogonal to a direction of combining the areas.

A plane coordinate system is defined with reference to either one of the two patterns of the mapping. Thereby, positional coordinates of information communication terminals connected to the wired LAN can be obtained, and the locations thereof can be identified. Note that regardless of which one of the two patterns is employed, coordinates in a direction of combining the areas match the other, and thus there is no problem with area identification. In this embodiment, two areas adjacent side by side are combined. However, at least three of areas adjacent north, south, east, and west can be combined to identify a chart arranged in a single pattern. The areas do not have to be mutually adjacent. The mapping can also be performed by combining relative positional relationship charts obtained based on separated areas.

The management server 11 causes one of the information communication terminals connected to the wired LAN to function as a PAP in turn. The management server 11 also causes the other information communication terminals which do not function as the PAP to each measure a radio wave intensity and to transmit a result thereof receives the result, and identifies the information communication terminals. During or after the above processing, the management server 11 also receives measurement results of radio wave intensities of information communication terminals connected to a wireless LAN.

The management server 11 can refer to the PAP database 22 based on terminal identification information of a PAP-functioning information communication terminal corresponding to the highest intensity in the radio wave intensity measurement results received from the information communication terminals connected to the wireless LAN; acquire location information associated with the terminal identification information of the PAP-functioning information communication terminal; register the location information as location information of the corresponding information communication terminal connected to the wireless LAN in the terminal database 20; and update the terminal database 20.

The management server 11 can also acquire the location information of the information communication terminal connected to the wireless LAN by calculating and using a distance based on a received radio wave intensity. In this case, the management server 11 can register and hold therein a distance calculated as second distance information as shown in FIG. 23 in addition to the first distance information shown in FIG. 19 in association with the information communication terminal. The second distance information shown in FIG. 23 may also be stored and managed in a separately provided database or the like.

FIG. 23 shows a correspondence table of the second distance information. The correspondence table is configured such that terminal identification information of a PAP-functioning information communication terminal is inputted in an input field of "PAP ID," terminal identification information of an information communication terminal connected to the wireless LAN is inputted in an input field of "device ID," and a calculated distance between the two information communication terminals is inputted in an input field "distance." In FIG. 23, terminal identification information of "PC01" is inputted in the input field of "PAP ID," terminal identification information of "PC11" is inputted in the input field of "device ID," and a distance of "17 m" is inputted in the input field of "distance."

The location estimating unit 25 of the management server 11 refers to the second distance information, and identifies information communication terminals connected to the wireless LAN which receive radio waves from at least three PAP-functioning information communication terminals connected to the wired LAN and which measure intensities of the radio waves. For example, as shown FIG. 24, rows of the correspondence table of the second distance information identify the information communication terminals. FIG. 24 shows that an information communication terminal "PC11" connected to the wireless LAN receives radio waves from three PAP-functioning information communication terminals "PC01," "PC02," and "PC03"; an information communication terminal "PC12," three PAP-functioning information communication terminals "PC03," "PC04," and "PC05"; an information communication terminal "PC13," three PAP-functioning information communication terminals "PC03," "PC04," and "PC06"; an information communication terminal "PC1.4," three PAP-functioning information communication terminals "PC04," "PC05," and "PC06"; an information communication terminal "PC15," three PAP-functioning information communication terminals "PC06," "PC07," and "PC08"; and an information communication terminal "PC16," three PAP-functioning information communication terminals "PC06," "PC07," and "PC08." Thus, the information communication terminals "PC12," "PC13," "PC14," "PC15," and "PC16" are identified.

Figure 25:
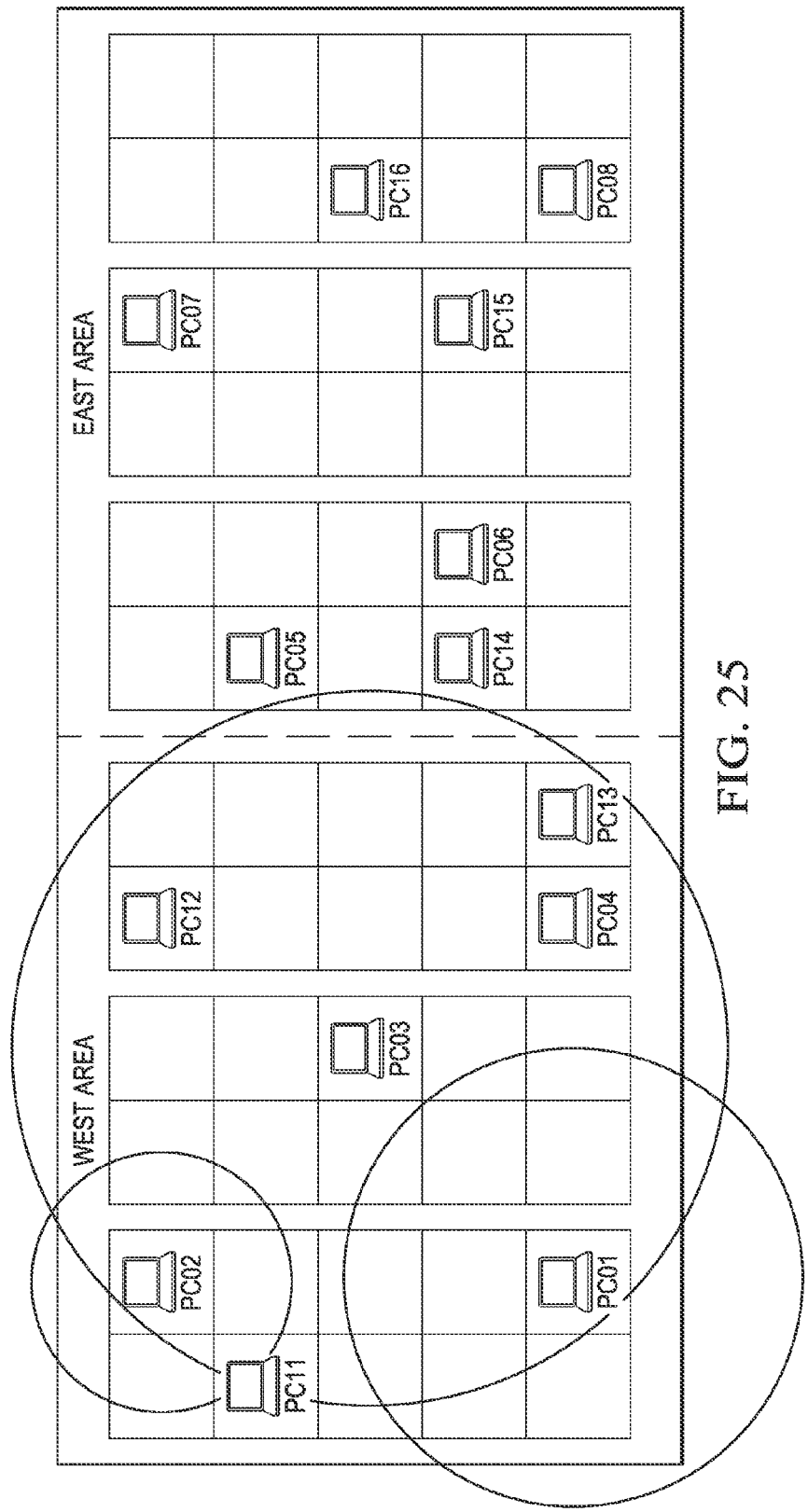
FIG. 25 is a diagram showing that an intersection of three circles is estimated as a location of an information terminal connected to the wireless LAN, the three circles being drawn so that the identified three information communication terminals can each be located as the center and that distances each associated with the information terminal connected to the wireless LAN can be set as a radius.

As shown in FIG. 25, the location estimating unit 25 selects one of the thus identified information communication terminals in turn, draws at least three circles each having the center of one of the information connection terminals connected to the wired LAN which broadcasts the radio wave to the selected information communication terminal and having a radius of a distance between the information communication terminal connected to the wired LAN and the selected information communication terminal connected to the wireless LAN, and estimates that an intersection of the at least three circles is a location of the selected information communication terminal. In FIG. 25, three circles having the centers of the PAP-functioning information communication terminals "PC01," "PC02," and "PC03" and having radii of distances between the information communication terminal "PC" and the information communication terminals "PC01," "PC02," and "PC03" are drawn, and an intersection of the three circles is estimated as the location of the information communication terminal "PC11," The location of every identified information communication terminal is estimated in this manner. Note that the location can be obtained as absolute coordinates by using simultaneous equations constituted of the aforementioned three equations. Thereafter, the location estimating unit 25 of the management server 11 stores the estimated location in the terminal database 20 in association with terminal identification information of the selected information communication terminal and manages the estimated location as location information.

As described above, regardless of which one of the two patterns symmetrical in the direction orthogonal to the direction of combining areas is mapped to define the plane coordinate system, the relative positional relationship among the information communication terminals connected to the wireless LAN can be properly mapped. Thus, an area where the information communication terminals connected to the wireless LAN exist can be identified based on coordinates of estimated locations in the direction of combining areas.

This means that a chart arranged in a single pattern can be used for a floor having an H-shape a four-tile pattern or the like which has three or more mutually adjacent areas in two or more directions, and thus absolute coordinates of information communication terminals can be estimated. In this embodiment, since a location of every information communication terminal connected to the wired LAN is unknown, the location is estimated by using the relation positional relationship and the map. However, only if a location of at least one information communication terminal connected to the wired LAN is fixed and location information thereof is registered, absolute coordinates of the other information communication terminals can be estimated by using the location information. This is because a location of one of information communication terminals is determined. Thus, mapping of a relative positional relationship chart can be uniquely performed, and absolute coordinates of the information communication terminals can be obtained by using the simultaneous equations constituted of the aforementioned three equations.

The number of information communication terminals simultaneously functioning as PAPs is not limited to one described, above, and may also be multiple according to the types of radio waves used for measurement within a range where no interference occurs, so that measurement result connection can be speeded up. The numbers of channels used in the wireless LAN are 14, 13, and 19 according to IEEE802.11b, IEEE802.1.1g, and IEEE802.11a, respectively. However, IEEE802.11b and IEEE802.11g require more than four channel intervals, and thus the number of simultaneously usable channels are 4, 3, respectively. Since no interface occurs according to IEEE802.1a, the number of simultaneously usable channels is 19. Accordingly, radio waves are broadcasted by using channels of which number is any one of the above numbers of simultaneously usable channels, and thereby measurement results can be simultaneously collected from the non-PAP-functioning information communication terminals number of which is the number of the simultaneously usable channels and information communication terminals connected to the wireless LAN As described above, even though locations of the wired LAN ports are not inputted and managed, locations of information communication terminals connected to the wired LAN can be identified, and locations of information communication terminals connected to the wireless LAN can be estimated. For this reason, an advanced switch or router capable of designating mapping of the ports and distributed addresses is not required. Moreover, a PAP-functioning information communication terminal is limited to one on each floor or within a range where no radio wave interference occurs, the radio wave interference does not occur. Further, also in this embodiment like the aforementioned embodiment, locations of information communication terminals can be estimated without requiring any new additional hardware, prior registration or management of location information of each node, or any change in a network configuration.

The location estimation system, the information communication terminals the agent program, and the location estimation method of the present invention have been described above in detail by referring to the drawings. The present invention is not limited to the embodiments described above but can be changed within a range in which those skilled in the art can come up with by implementing another embodiment, or by adding any element to the present invention, or changing or omitting any element of the present invention. Any modes thus made should be included within the scope of the present invention, as long as these modes provide the same operations and advantageous effects as those of the present invention.

Note that the agent program installed on an information communication terminal can be provided as a computer-readable program, and can be stored in a recording medium such as a flexible disk a CD-ROM, a DVD-ROM, an SD card or an HDD, and thus be provided therein.

The invention claimed is:

1. An information communication terminal comprising:
a processor; and
a memory coupled to the processor, wherein the memory comprises instructions which, when executed by the processor, cause the processor to:
responsive to the information communication terminal being connected to a wired network and receiving from a management server a mode change instruction to switch to a communication mode of performing wireless communication directly with at least one other information communication terminal, switch the communication mode to a pseudo-access point (PAP) communication mode;
broadcast a carrier wave comprising terminal identification information of the information communication terminal responsive to the information communication terminal being in the PAP communication mode;

responsive to the information communication terminal not being connected to the wired network, measure an intensity of a carrier wave that is broadcasted by a second information communication terminal functioning in the PAP communication mode, wherein the carrier wave comprises terminal identification information of the second information communication terminal;

transmit the measured intensity to the management server together with the terminal identification information of the second information communication terminal, wherein the management server estimates location information of the information communication terminal by using the location information of the second information communication terminal and the measured intensity and stores the estimated location information in association with the terminal identification information of the information communication terminal; and responsive to receiving from the management server a mode change instruction to switch to a communication mode of performing wireless communication via an access point connected to the wired network, switch the communication mode to a non-PAP communication mode.

2. The information communication terminal according to claim 1, wherein the instructions further cause the processor to:

in response to determining the information communication terminal is connected to the wired network, determine whether the information communication terminal is set in PAP communication mode, responsive to determining the information communication terminal is not set in the PAP communication mode, send the management server the terminal identification information, wherein the management server generates the location information of the information communication terminal.

3. The information communication terminal according to claim 1, wherein the carrier wave further comprises PAP identification information for identifying the information communication terminal as a PAP, wherein the information communication terminal broadcasts the carrier wave at regular intervals.

4. The information communication terminal according to claim 1, wherein the instructions further cause the processor to:

determine whether an intensity of the carrier wave is higher than a threshold.

5. The information communication terminal according to claim 1, wherein the information communication terminal controls the intensity of the broadcast carrier wave.

6. The information communication terminal according to claim 1, wherein the carrier wave is an electromagnetic wave or an ultrasonic wave.

7. The information communication terminal according to claim 1, wherein responsive to determining the information communication terminal is connected to the wired network and responsive to not receiving the mode change instruction, the information communication terminal measures the intensity of the carrier wave broadcasted by a second information communication terminal functioning in the PAP communication mode.

8. A computer program product comprising a non-transitory computer readable medium having a computer readable program stored therein, wherein the computer readable program, when executed on an information communication terminal, causes the information communication terminal to:

responsive to the information communication terminal being connected to a wired network and receiving from a management server a mode change instruction to switch to a communication mode of performing wireless communication directly with at least one other information communication terminal, switch a communication mode to a pseudo-access point (PAP) communication mode;

broadcast a carrier wave comprising terminal identification information of the information communication terminal responsive to the information communication terminal being in the PAP communication mode;

responsive to the information communication terminal not being connected to the wired network, measure an intensity of a carrier wave that is broadcasted by a second information communication terminal functioning in the PAP communication mode, wherein the carrier wave comprises terminal identification information of the second information communication terminal;

transmit the measured intensity to the management server together with the terminal identification information of the second information communication terminal, wherein the management server estimates location information of the information communication terminal by using the location information of the second information communication terminal and the measured intensity and stores the estimated location information in association with the terminal identification information of the information communication terminal; and responsive to receiving from the management server a mode change instruction to switch to a communication mode of performing wireless communication via an access point connected to the wired network, switch the communication mode to a non-PAP communication mode.

9. The computer program product according to claim 8, wherein the computer readable program further causes the information communication terminal to:

determine whether the information communication terminal is set in PAP communication mode in response to determining the information communication terminal is connected to the wired network;

responsive to determining the information communication terminal is not set in the PAP communication mode, send the management server the terminal identification information, wherein the management server generates the location information of the information communication terminal.

10. The computer program product according to claim 8, wherein the carrier wave further comprises PAP identification information for identifying the information communication terminal as a PAP, wherein the information communication terminal broadcasts the carrier wave at regular intervals.

11. The computer program product according to claim 8, wherein the computer readable program further causes the information communication terminal to determine whether an intensity of the carrier wave is higher than a threshold.

12. The computer program product according to claim 8, wherein responsive to determining the information communication terminal is connected to the wired network and responsive to not receiving the mode change instruction, the information communication terminal measures the intensity of the carrier wave broadcast by the second information communication terminal functioning in the PAP communication mode.

13. A location estimation system comprising:
a plurality of information communication terminals; and
a management server connected to a wired network and configured to estimate a location of each of the plurality of information communication terminals and to store location information of the plurality of information communication terminals,
wherein responsive to a given information communication terminal receiving from the management server a mode change instruction to switch to a communication mode of performing wireless communication directly with a different information communication terminal, the given information communication terminal switches a communication mode to a pseudo-access point (PAP) communication mode;
wherein the given information communication terminal broadcasts a carrier wave comprising terminal identification information of the given information communication terminal responsive to the given information communication terminal being in the PAP communication mode;
wherein responsive to the given information communication terminal not being connected to the wired network, the given information communication terminal measures an intensity of a carrier wave that is broadcasted by a second information communication terminal functioning in the PAP communication mode, wherein the carrier wave comprises terminal identification information of the second information communication terminal;
wherein the given information communication terminal transmits the measured intensity to the management server together with the terminal identification information of the second information communication terminal; and
wherein the management server estimates location information of the information communication terminal by using the location information of the second information communication terminal and the measured intensity and stores the estimated location information in association with the terminal identification information of the information communication terminal.

14. The location estimation system according to claim 13, wherein the management server manages a range information database, a terminal database, and a PAP database, the range information database storing therein location information and a range of network addresses in association with each other, the terminal database storing therein the terminal identification information of the information communication terminal and location information of the information communication terminal in association with each other, the PAP database storing therein the terminal identification information and the location information of an information communication terminal functioning as the PAP in association with each other, and
wherein responsive to receiving the terminal identification information transmitted from the given information communication terminal, the management server refers to the range information database, generates the location information of the given information communication terminal, and updates the terminal database by registering the location information in the terminal database in association with the terminal identification information.

15. The location estimation system according to claim 13, wherein the management server selects one of the information communication terminals connected to the wired network to cause the information communication terminal to function as the PAP, and issues to the selected information communication terminal the mode change instruction to switch to the communication mode of performing wireless communication directly with a different one of the information communication terminals.

16. The location estimation system according to claim 13, wherein the management server manages a range information database, a terminal database, and a PAP database, the range information database storing therein location information and a range of network addresses in association with each other, the terminal database storing therein the terminal identification information of the information communication terminal and location information of the information communication terminal in association with each other, the PAP database storing therein the terminal identification information and the location information of an information communication terminal functioning PAP in association with each other, and
wherein the management server refers to the PAP database on the basis of the terminal identification information of the information communication terminal functioning as the PAP which achieves the highest intensity among the intensities received from the information communication terminals connected to the wireless radio network, acquires the location information associated with the terminal identification information, and updates the terminal database by registering the location information in the terminal database as the location information of the information communication terminal connected to the wireless network.

17. The location estimation system according to claim 13, wherein the management server selects at least one of the information communication terminals connected to the wired network and issues the mode change instruction to the selected information communication terminal to cause the selected information communication terminal to function as the PAP, the intensity measuring unit of each of unselected ones of the information communication terminals connected to the wired network measures the intensity of the carrier wave,
wherein the management server iterates processing of calculating a distance between the information communication terminal functioning as the PAP and each unselected information communication terminal connected to the wired network on the basis of the measured intensity until all the information communication terminals connected to the wired network are selected,
wherein the management server generates a relative positional relationship chart showing a two-dimensional relative positional relationship among the information communication terminals connected to the wired network by using the obtained distances between the information communication terminals,
wherein the management server maps the relative positional relationship chart on a map generated on the basis of pre-stored map data and showing an arrangement of wired network connection ports, and
wherein the management server identifies a location of each of the information communication terminals connected to the wired network, on the basis of a location of a corresponding one of the wired network connection ports.

18. The location estimation system according to claim 17, wherein the management server registers and manages the location information of the information communication terminals for each of areas, generates the relative positional relationship chart for each of the areas, combines the relative positional relationship charts generated for at least two adjacent ones of the areas, maps the combined relative positional relationship charts on the map, and thereby identifies the locations of the information communication terminals connected to the wired network.

19. The location estimation system according to claim 17, wherein the management server manages a terminal database and a PAP database, the terminal database storing therein the terminal identification information of the information communication terminal and location information of the information communication terminal in association with each other, the PAP database storing therein the terminal identification information and the location information of an information communication terminal functioning as the PAP in association with other, and
wherein the management server refers to the PAP database on the basis of the terminal identification information of the information communication terminal functioning as the PAP which achieves the highest intensity among the intensities received from the information communication terminals connected to the wireless radio network, thereby acquires location information associated with the terminal identification information, and updates the terminal database by registering the location information in the terminal database as location information of the information communication terminal connected to the wireless network.

20. The location estimation system according to claim 17, wherein the management server manages a terminal database storing therein the terminal identification information of the information communication terminal and location information of the information communication terminal in association with each other,
wherein for each of the information communication terminals connected to the wireless network, the management server selects at least three pieces of terminal identification information of information communication terminals functioning as the PAPs which are stored in association with terminal identification information of the each information communication terminal connected to the wireless network, by using distance information in which distances calculated from the intensities received from the respective information communication terminals connected to the wireless network are stored in association with the terminal identification information pieces of the information communication terminals each functioning as the PAP, and
wherein the management server:
acquires distances respectively associated with the at least three selected pieces of terminal identification information,
draws circles on the map on which the relative positional relationship chart is mapped, the circles having the centers of the information communication terminals identified by the at least three selected pieces of terminal identification information and having radii of the acquired distances, and
updates the terminal database by registering location information of an intersection of the drawn circles in the terminal database as location information of the information communication terminal connected to the wireless network.

21. A method performed by a location estimation system including a plurality of information communication terminals and a management server connected to a wired network and configured to estimate a location of each of the plurality of information communication terminals, the method comprising:

the managing server selecting one of the information communication terminals connected to the wired network, as an information communication terminal to function as a pseudo-access point (PAP) and issuing, to the selected information communication terminal, a mode change instruction to switch to a communication mode of performing wireless communication directly with a different one of the information communication terminals;
the managing server storing terminal identification information and location information of the selected information communication terminal in association with each other in a PAP database;
the selected information communication terminal switching to the communication mode and to function as the PAP, responsive to receiving the mode change instruction;
the selected information communication terminal functioning as the PAP broadcasting a carrier wave comprising the terminal identification information of the selected information communication terminal functioning as the PAP;
a given information communication terminal, responsive to determining the given information communication terminal is not connected to the wired network, measuring an intensity of a carrier wave that is broadcasted by the selected information communication terminal functioning as the PAP, wherein the carrier wave comprises terminal identification information of the selected information communication terminal, and transmitting the measured intensity to the management server together with the terminal identification information of the selected information communication terminal functioning as the PAP; and
the management server estimating location information of the given information communication terminal by using the location information of the selected information communication terminal functioning as the PAP and the measured intensity, and storing the estimated location information in association with the terminal identification information of the given information communication terminal in a terminal database.

22. The method according to claim 21, further comprising:
responsive to all the information communication terminals connected to the wired network having been selected in sequence to function as the PAP and the information communication terminals except the information communication terminal functioning the PAP transmit the respective measured intensities to the management server,
the management server calculating a distance between each two of the information communication terminals connected to the wired network, from the intensities measured by the information communication terminals, and generating, by using the distances, a relative positional relationship chart showing a two-dimensional relative positional relationship among the information communication terminals;
the management server mapping the relative positional relationship chart in a map generated on the basis of pre-stored map data and showing an arrangement of wired network connection ports, and identifying a location of each of the information communication terminals connected to the wired network, on the basis of a location of a corresponding one of the wired network connection ports; and the management server:
- for each of the information communication terminals connected to a wireless network, selecting at least three pieces of terminal identification information of the information communication terminals each functioning as the PAP which are stored in association with the terminal identification information of the each information communication terminal connected to the wireless network, by using distance information in which distances calculated from the intensities received from the respective information communication terminals connected to the wireless network are stored in association with the terminal identification information pieces of the information communication terminals each functioning as the PAP;
- acquiring distances respectively associated with the at least three selected pieces of terminal identification information;
- drawing circles on the map on which the relative positional relationship chart is mapped, the circles having the centers of the information communication terminals identified by the at least three selected pieces of terminal identification information and having radii of the acquired distances; and
- storing, as location information of the information communication terminal connected to the wireless network, location information of an intersection of the drawn circles in a terminal database, in association with the terminal identification information of the information communication terminal.

* * * * *